(12) United States Patent
Hirai

(10) Patent No.: US 6,943,834 B1
(45) Date of Patent: Sep. 13, 2005

(54) APPARATUS AND METHOD OF CONVERTING IMAGE DATA TO VIDEO SIGNALS

(75) Inventor: Yuichi Hirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/243,714

(22) Filed: Feb. 3, 1999

(30) Foreign Application Priority Data

Feb. 6, 1998 (JP) .......................... 10-025436
Jul. 16, 1998 (JP) .......................... 10-216557

(51) Int. Cl.⁷ .......................... H04N 5/76; H04N 5/228; H04N 7/12
(52) U.S. Cl. .............. 348/231.6; 348/222.1; 375/240.24
(58) Field of Search .................. 348/231.1, 231.5, 348/222.1, 222.01, 231.9, 294, 311, 231.6; 375/240.13, 240.26, 240.24

(56) References Cited

U.S. PATENT DOCUMENTS 5,845,011 A * 12/1998 Miyamoto et al. .......... 382/232
5,900,909 A * 5/1999 Parulski et al. .......... 348/231.6
6,018,363 A * 1/2000 Horii .................. 348/219.1
6,046,771 A * 4/2000 Horii .................... 348/243
6,130,711 A * 10/2000 Fukushima .............. 348/231.6
6,148,031 A * 11/2000 Kato .................... 375/240.13
6,160,577 A * 12/2000 Nishimura et al. ........... 348/96
6,201,571 B1 * 3/2001 Ota .............................. 348/239
6,377,301 B1 * 4/2002 Hieda .................... 348/231.99

* cited by examiner

Primary Examiner—David L. Ometz
Assistant Examiner—Lin Ye
(74) Attorney, Agent, or Firm—Morgan & Finnegan, LLP

(57) ABSTRACT

A method and system are provided which involve a first memory used for storing first image data, an image processing unit adapted to change the first image data read from the first memory to second image data, and a second memory used for storing the second image data. The method or system selects the first image data stored in the first memory or the second image data stored in the second memory and converts the selected first or second image data to a video signal. The second image data is selected after the second image data is stored in the second memory, and selection between the first and second image data is changed during a vertical blanking period.

16 Claims, 29 Drawing Sheets

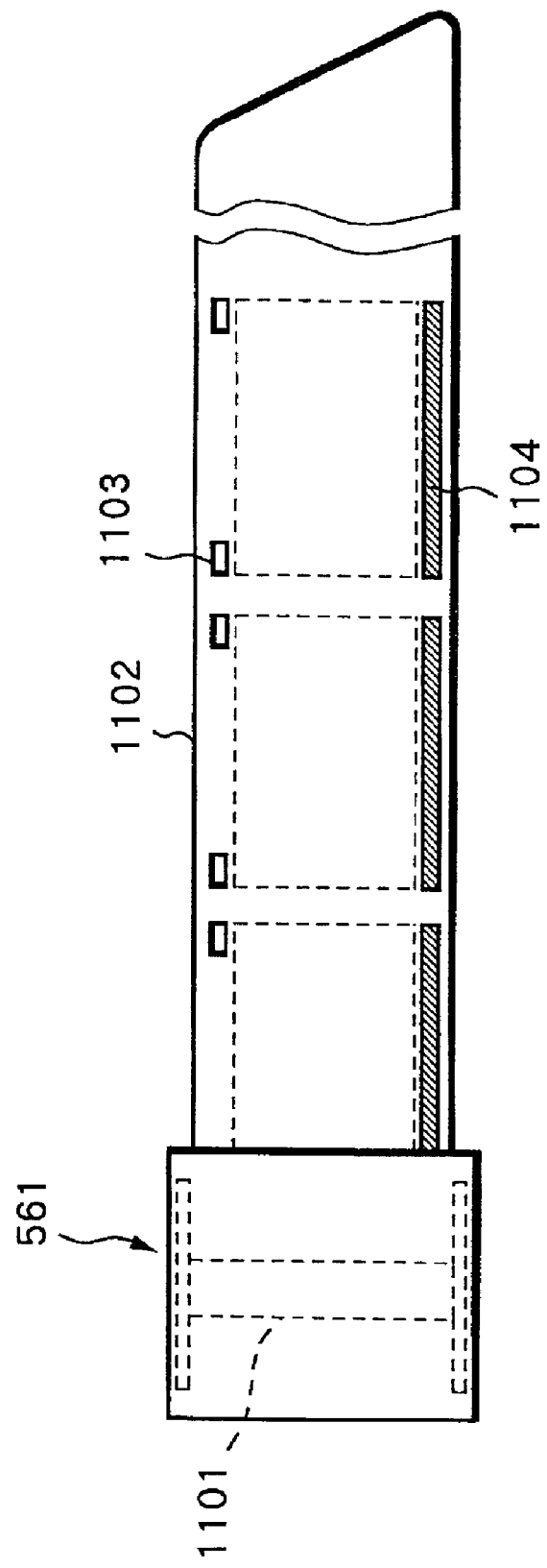

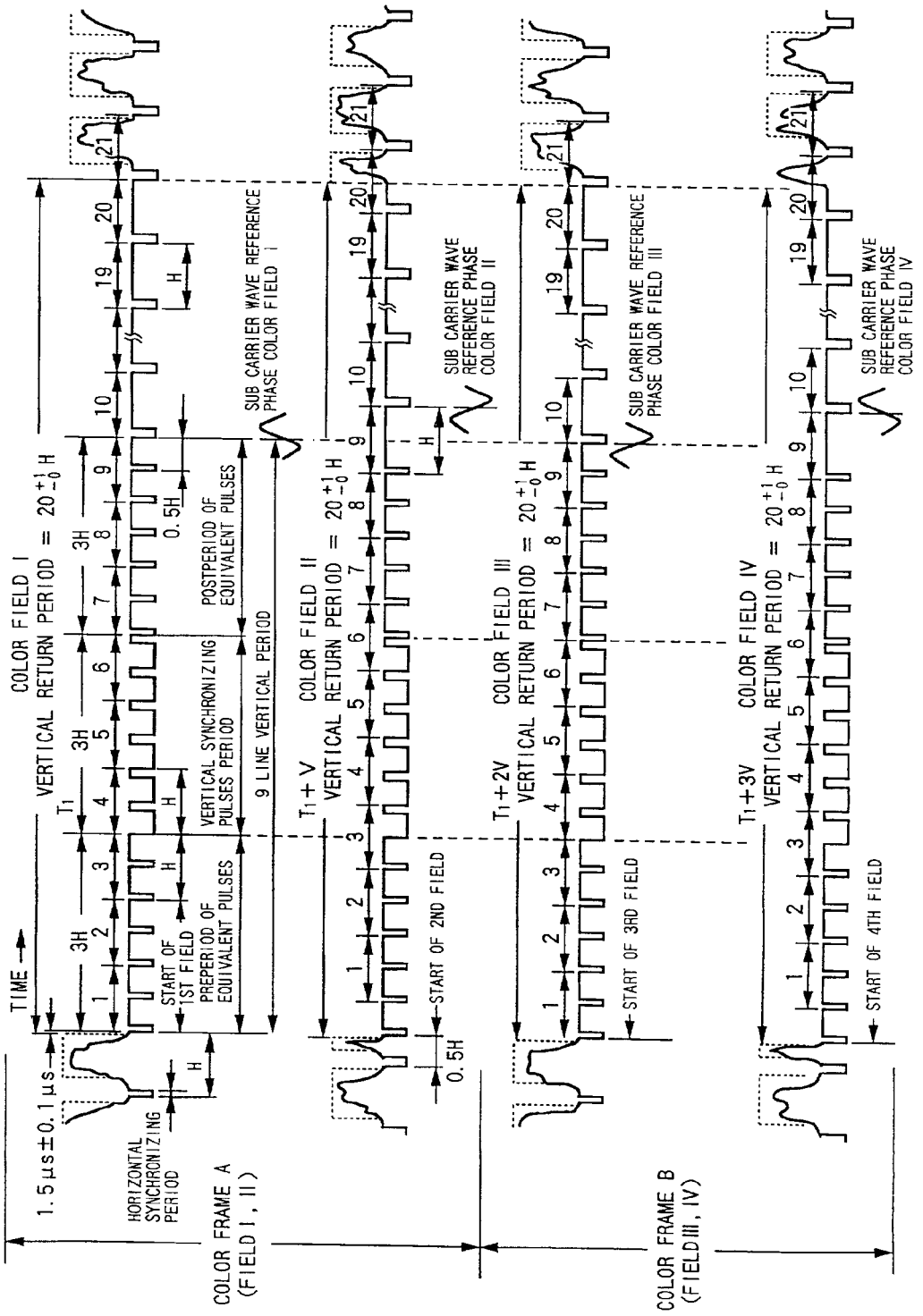

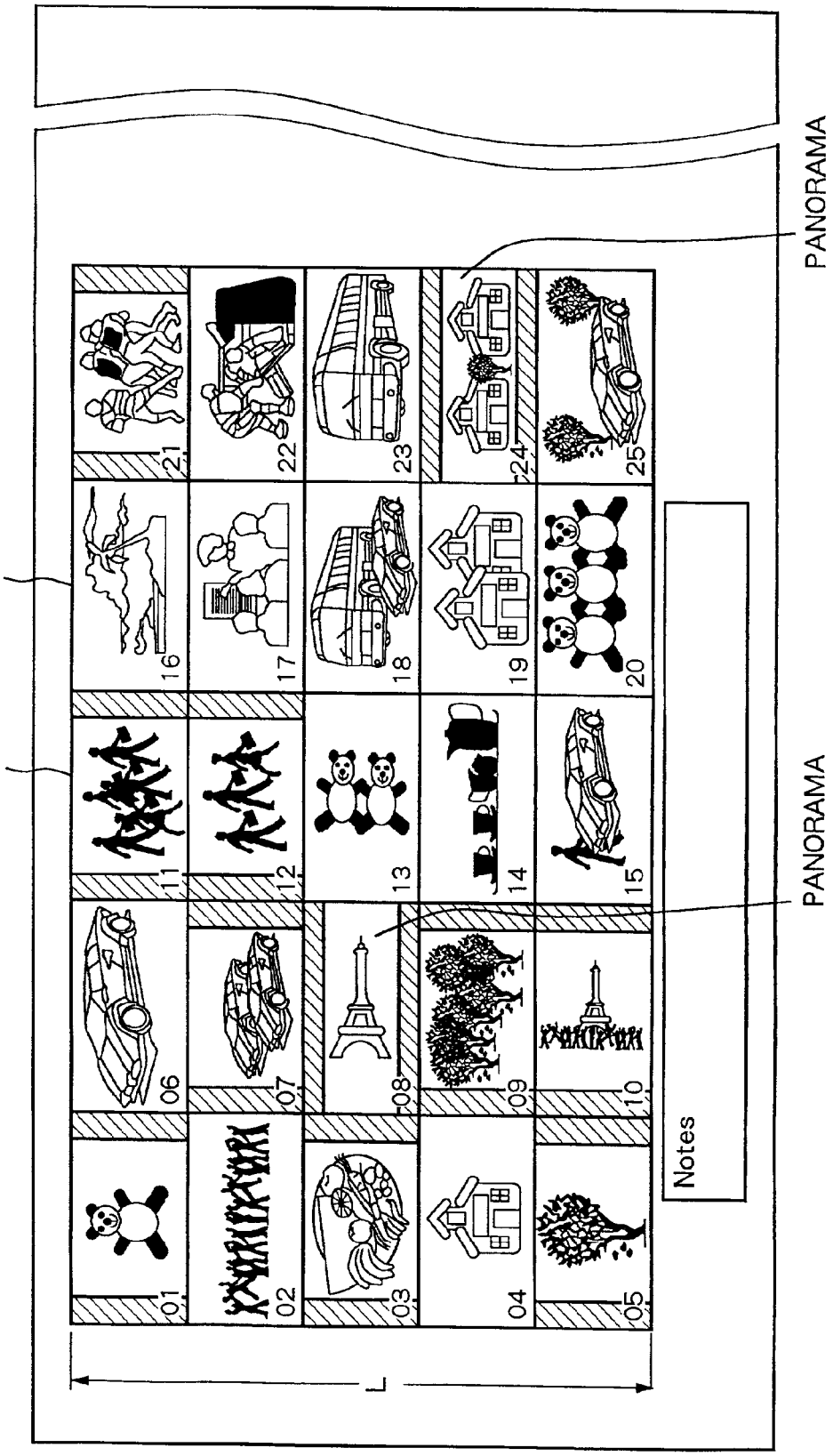

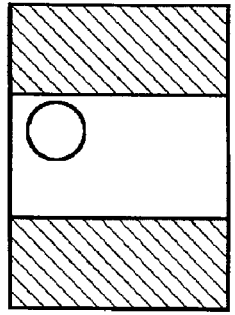
FIG.29D ROTATED BY 270°
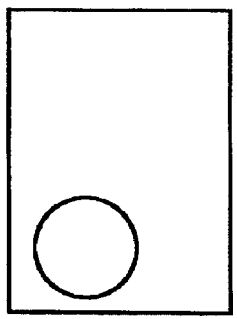
FIG.29A ORIGINAL POSITION
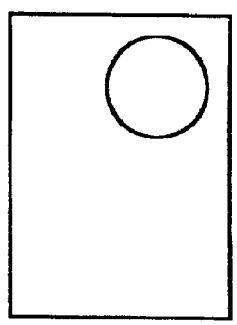
FIG.29C ROTATED BY 180°
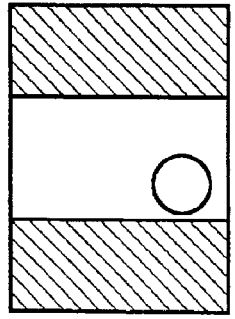
FIG.29B ROTATED BY 90°

APPARATUS AND METHOD OF CONVERTING IMAGE DATA TO VIDEO SIGNALS

BACKGROUND OF THE INVENTION

The present invention relates to an image processing apparatus and method for converting image data to video signals and, more particularly, for selecting a first image data stored in a first memory or a second image data stored in a second memory and converting the selected first or second image data to a video signal, where the second image data is selected after the second image data is stored in the second memory, and selection between the first and second image data is changed during a vertical blanking period.

Conventionally, there is an image processing apparatus which accepts still image information as input information, stores the still image information in frame memory, then outputs the information to a display device. As an image processing apparatus of this type, a film player which senses images on a developed photograph film using a line sensor or a field sensor, such as CCD (charge coupled device), converts the sensed images into image signals, and displays the images on a display has been suggested.

An external view of a system including such a film player is shown in FIG. 22. In FIG. 22, reference numeral 560 denotes a film player (main body), and, through a film insertion opening 562 of the film player 560, a film cartridge 561 is inserted. In the example of FIG. 22, an APS (advanced photo system) film cartridge is shown for providing a developed film. For providing a 35 mm film (sleeve or mount), a member for holding a sleeve (or mount) is used. Further, reference numeral 563 denotes a display device conforming to television standards; 564, a cable for transferring video signals; 565, a cord; 566, a remote controller; and 661 to 668, various control buttons.

Next, a brief view of an APS film is shown in FIG. 23. As shown in FIG. 23, a film 1102 is preserved within the film cartridge 561, wound around a spool 1101. The film 1102 has perforations 1103 and electromagnetic recording areas 1104.

A destination of the output from the film player 560 may be the conventional display device 563 shown in FIG. 22. The film player 560 and the display device 563 communicate using video signals. Since the display device 560 conforming to the television standards performs scanning in synchronization with a horizontal synchronizing signal and a vertical synchronizing signal (or a composite signal in which the foregoing two kinds of synchronizing signals are mixed), and image signals are combined with the synchronizing signals to form the video signals.

As for video signals, there are several standards; NTSC (National Television System Committee) which is a color television standard adopted in Japan and the United States, PAL (Phase Alteration by Link) which is one of color television standards, SECAM (Sequentied Colours Amemoir) which is another one of the color television standards, and so on. As typical video signals, waveforms of NTSC (EIA RS-170) video signals in a four-field sequence are shown in FIG. 24.

A user interface to the display device 563 connected to the film player 560 is the remote controller 566 shown in FIG. 22, for instance. In the example shown in FIG. 22, the remote controller 566 is connected to the film player 560 via the cord 565, but infrared is widely used instead of the cord 565.

In the APS, 15-, 25-, and 40-exposure films are available. All the images exposed on a film are printed out as an index print after the film is developed. A brief view of an index print is shown in FIG. 25. For displaying a desired image on a film using the film player 560, a user selects the exposure number on the basis of information which is similarly to the index print, using the remote controller 566. Therefore, it is common that the film player 560 has a function for displaying information similarly to the index print.

FIGS. 26A to 26C show cases where a display screen is divided in three different ways for displaying index images. FIG. 26A shows a case where an index image is displayed in a manner similar to the index print. Since the maximum number of exposures is 40 in the APS as described above, if the display screen has 512×1024 pixels in the vertical and horizontal directions, respectively, then the size of each thumbnail image of the index image is 84×112 pixels. However, the ratio of the height to the width of a display screen conforming to the NTSC standard is 3:4, and, for expressing each pixel of the index image as a square, it is general to edit the index image so as to be expressed within 480×640 pixels, in consideration of the size of memory for storing the edited index image. FIG. 26B shows a case where the index image shown, in FIG. 26A is edited to be within the size of 480×640 pixels. Further, it is common to display the image on the display screen as shown in FIG. 26C.

A user selects a desired thumbnail image from the index image displayed as shown in FIG. 26C. The buttons 661 to 664 of the remote controller 566 are for changing a selected image among the thumbnail images (a selected image is high-lighted by being displayed in reverse or surrounded by a frame, for instance) to up, down, right and left. After a desired thumbnail image is selected from the index image, the selection button 667 is pressed to set the selection of the thumbnail image. Further, in order to cancel the selection of the image, the cancel button 668 is to be pressed. After the selection, the original image of the selected thumbnail image is displayed by itself on the display screen. Thereafter, it is possible to change images to be displayed using the up button 665 and the down button 666. Further, it is possible to configure the system to display the index image when the cancel button 668 is pushed while displaying images one by one.

For displaying an image read by the conventional film player on the display device adopting television standards as described above, image signals should be combined with the synchronizing signals as shown in FIG. 24.

FIG. 27 is a block diagram showing the main components of a conventional apparatus for video display. The apparatus includes a controller 901, a storage unit 902, a decoder 904, an A/D converter 905, a D/A converter 906, a video encoder 907, and video memory 1201. The source of image information in the film player is a film, as described above, and images on the film are dealt with in a form of electric signal obtained by a CCD, for instance, as a result of photoelectric conversion.

Referring to FIG. 27, electric image signals (level signals) are digitized by the A/D converter 905, then processed by the decoder 904 for extracting valid image signals from the digitized signals. Although the order of the input image signals may differ depending upon the scanning method of the CCD, the digitized signals of a frame image are eventually stored in the storage unit 902. The stored data is transferred to the video memory 1201, and consecutively outputted to the D/A converter 906 at a video rate. The digital signals converted into analog signals by the D/A converter 906 are encoded into video signals which include luminance information, color information, and synchronizing information by the video encoder 907, then outputted to the display device 563 (FIG. 22).

In the film player 560 as described above, the source of image information is a photograph film (developed), not a moving image, and it is necessary to keep providing video signals of the selected still image on the film to the display device 563. Furthermore, in order to change the currently displayed image to another image, the content of the storage unit 902 must be updated to image information of a new image to be displayed next while outputting video signals of the current image. In the conventional apparatus, the storing and the reading of data are performed in parallel using the video memory 1202 of a dual-port type. In this configuration, the storage unit 903 and the video memory 1201 are used for different purposes, and when generating an index image, for instance, images on the film are sensed and stored in the storage unit 902 one by one, the size of each image is reduced, then the reduced (thumbnail) image is stored in the video memory 1201 in an index image format, thereby the index image as shown in FIG. 26C is outputted to the display device 563.

In most cases, the output from a CCD can be directly used for display, as apparently seen in a case of a camcorder. When sensing a moving image, image information changes as time elapses, and it is not necessary to temporarily store the image information in the storage unit 902 (except a case of performing digital processing on the image information). In contrast, in the film player 560 as described above, a frame of a film is sensed by a CCD while illuminating it from backside, and the illuminating of the frame, for scanning, for a long time causes a raise in temperature inside the film player 560 to a high degrees. Thus, the light is turned off after necessary information is stored in the storage unit 902.

With the foregoing reasons, video signals are generated using the storage unit 902 and the video memory 1201. However, a dual-port memory device is more expensive than a single-port memory device, and it is preferred to avoid using dual-port memory devices to provide an inexpensive film player. There is an apparatus using a single-port memory device instead of a dual-port memory device; however, in this apparatus, while reading data (video signals) from the single-port memory, updating of the content of the memory is inhibited except during synchronizing periods. In other words, storing of data of an image to be displayed next must be performed during the synchronizing periods.

FIG. 28 shows timing of displaying a frame image for visually illustrating the video synchronizing periods. Referring to FIG. 29, a frame period is 1/30 second, and a field period is 1/60 second (16.7 ms). In NTSC, an interlacing method (a scanning method adopted in a raster-scanning type display device) is adopted, and images of two different fields are alternatively outputted. In FIG. 29, there is 10.9 μs for a horizontal synchronizing period in every horizontal scanning period, and 571.5 μs for a vertical synchronizing period in every vertical scanning period.

It is understood from the aforesaid numbers that periods when updating of data, while reading signals from a single-port memory device, used as the video memory 1201, is allowed is only about 20% of one field period. Even if the memory has a capacity of storing images of several fields and a new image is written to the memory part with part in an area other than an area where image signals are currently read out, it takes several field periods to store a frame image. After the new frame image is stored, the area, in the video memory 1201, which is accessed for reading image data is changed to the area where the new image is stored.

Therefore, in order to optimize the user interface by shortening the period required since another image is requested to be displayed until the requested image is actually displayed, it is preferable to use a dual-port memory device or a plurality of single-port memory devices while selecting one of them each time after a new image is stored.

In either case, for providing a satisfactory user interface, the cost of an apparatus becomes high. Furthermore, use of a plurality of memory devices makes the configuration of a control circuit, such as a bus arbiter, complicated.

More specifically, in an image processing apparatus which receives still image information and outputs video signals for display, especially in an apparatus, such as a film player, which is required to consecutively display a plurality of still images, it is necessary to temporality store each still image in a storage. Furthermore, if the storage is a single-port device, while reading data of the still image from the storage at video rate, data can be updated only during the synchronizing period; or the storage has to be a dual-port device.

The aforesaid control is for simply displaying a still image of an arbitrary frame. Further, there is a case where the apparatus is added with a function of rotating a displayed image by operating the buttons of the remote controller 566. More specifically, it is possible to configure the system so that the button 661 is for designating rotation of an image by 90 degrees, the button 662 is for designating rotation by 180 degrees, the button 663 is for designating rotation by 270 degrees, and the button 664 is for designating to display the image in the original direction (or for designating to display a mirror image), for instance.

Examples of images displayed on the display device 563 when an image is rotated as described above, are shown in FIGS. 29A to 29D. In FIG. 29A, an image is originally displayed in a ratio of 3:4 (vertical:horizontal). FIG. 21B shows an image when the original image, shown in FIG. 21A, is rotated by 90 degrees, FIG. 29C shows an image when the original image is rotated by 180 degrees, and the FIG. 29D shows an image when the original image is rotated by 270 degrees. Note, when the image is rotated by 90 or 270 degrees, the size of the image is reduced to 75% (=¾) of the original size so that the image is not cut because of the size and shape of the display screen.

For performing the aforesaid rotation processing, including the reduction of an image, a displayed image is to be modified when the apparatus has the configuration as shown in FIG. 27, and during modifying the image, no image can be displayed. In order to keep displaying an image, the modification of the image must be completed in one vertical blanking period between fields, which requires an apparatus of very high speed. Furthermore, since the reduction of an image should be performed along with the transference of a frame image to the video memory 1201 which is a dual-port memory device, as described above, higher speed and more complicated circuit is required. Further, in a case where storage area for storing image data which is currently displayed and storage area for storing developed (e.g., rotated) image data are identical, too, development of an image to be displayed next must be performed in one vertical blanking period so as to start displaying the developed image in the next frame period.

In the above cases, if DRAM is used as the video memory 1201, a vertical blanking period can not be assigned for refreshing operation, thus it is necessary to access all the addresses in one frame period to maintain the data in the DRAM. In other words, it is not possible to reserve an area in the DRAM for an index image and keep data of the index image when displaying of a single image is designated, as a function of the film player as described above, because all the data stored in the DRAM has to be read in each frame period. Thus, it is necessary to develop an index image each time the index image is requested to be displayed, which requires a longer time than rotating an image.

As described above, in an image processing system for displaying an image stored in frame memory which does not have video RAM for exclusive use for display, development of an image to be displayed next should be performed during the synchronizing period, or a plurality of memory devices or areas, which are independently controlled, are provided and sequentially used for developing images. However, in the image processing system, for modifying an image which is currently stored in the memory for display and displaying the modified image, there is no other way but developing image data in another memory area little by little in spare moments from reading of the data to be displayed (e.g., vertical synchronizing period).

SUMMARY OF THE INVENTION

The present invention has been made in consideration of the above situation, and has as its object to provide an image processing apparatus and method capable of updating an image and switching to the updated image without a break in displaying of an image.

Further, it is another object of the present invention to provide an image processing apparatus and method capable of performing processing, such as rotation, on an image which is currently displayed while displaying the image during the processing using general purpose memory, and switching to the processed image without a break in displaying of an image.

Furthermore, it is another object of the present invention to provide an image processing apparatus and method capable of improving throughput for developing an image by omitting to develop blank spaces of the image.

According to the present invention, the foregoing object is attained by providing an image processing apparatus comprising: input means for inputting image data of a still image; branching means for branching the image data inputted by the input means; first memory used for storing one of the image data branched by the branching means; memory controller which controls writing of the one of the image data, branched by the branching means into the first memory, into the first memory; a first switch for selecting image data stored in the first memory or the other branched image data not stored in the first memory; and output means for outputting the image data selected by the first switch.

According to the present invention, the foregoing object is also attained by providing an image processing apparatus comprising: first memory used for storing input image data; image processing means for reading the image data from the first memory and applying predetermined processing to the image data; second memory used for storing the image data applied with the predetermined processing; a first switch for selecting the image data stored in the first memory or the image data stored in the second memory; and output means for outputting the image data selected by the first switch, wherein the image processing means applies the predetermined processing to the image data stored in the first memory while the image data is also outputted to the output means.

Further, according to the present invention, the foregoing object is also attained by providing an image processing method comprising: an input step of inputting image data of a still image; a branching step of branching the image data inputted in the input step; a first storing step of storing one of the image data branched in the branching step; a memory control step of controlling timing for writing the one of the image data branched in the branching step, in the first storing step; a first selecting step of selecting image data stored in the first memory or the other branched image data not stored in the first storing step; and an output step of outputting the image data selected in the first selecting step.

Furthermore, according to the present invention, the foregoing object is also attained by providing an image processing method comprising: a first storing step of storing input image data; an image processing step of reading the image data stored in the first storing step and applying predetermined processing to the image data; a second storing step of storing the image data applied with the predetermined processing; a first selecting step of selecting the image data stored in the first storing step or the image data stored in the second storing step; and an output step of outputting the image data selected in the first selecting step, wherein, in the image processing step, the predetermined processing is applied to the image data stored in the first storing step while the image data is simultaneously outputted in the output step.

In accordance with a further embodiment, a method and system are provided which involve a first memory used for storing first image data, an image processing unit adapted to change the first image data read from the first memory to second image data, and a second memory used for storing the second image data. The method or system selects the first image data stored in the first memory or the second image data stored in the second memory and converts the selected first or second image data to a video signal. The second image data is selected after the second image data is stored in the second memory, and selection between the first and second image data is changed during a vertical blanking period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 23 is an explanatory view of an APS film;

FIG. 24 is a timing chart showing the NTSC format;

FIG. 25 is a view showing an example of an APS index print;

FIG. 29A is a view showing an example of a displayed original image;

FIG. 29B is a view showing the image rotated by 90 degrees;

FIG. 29C is a view showing the image rotated by 180 degrees; and

FIG. 29D is a view showing the image rotated by 270 degrees.

DETAILED DESCRIPTION OF THE PREFERRED EMBODIMENTS

Preferred embodiments of the present invention will be described in detail below in accordance with the accompanying drawings.

First Embodiment

Figure 1:
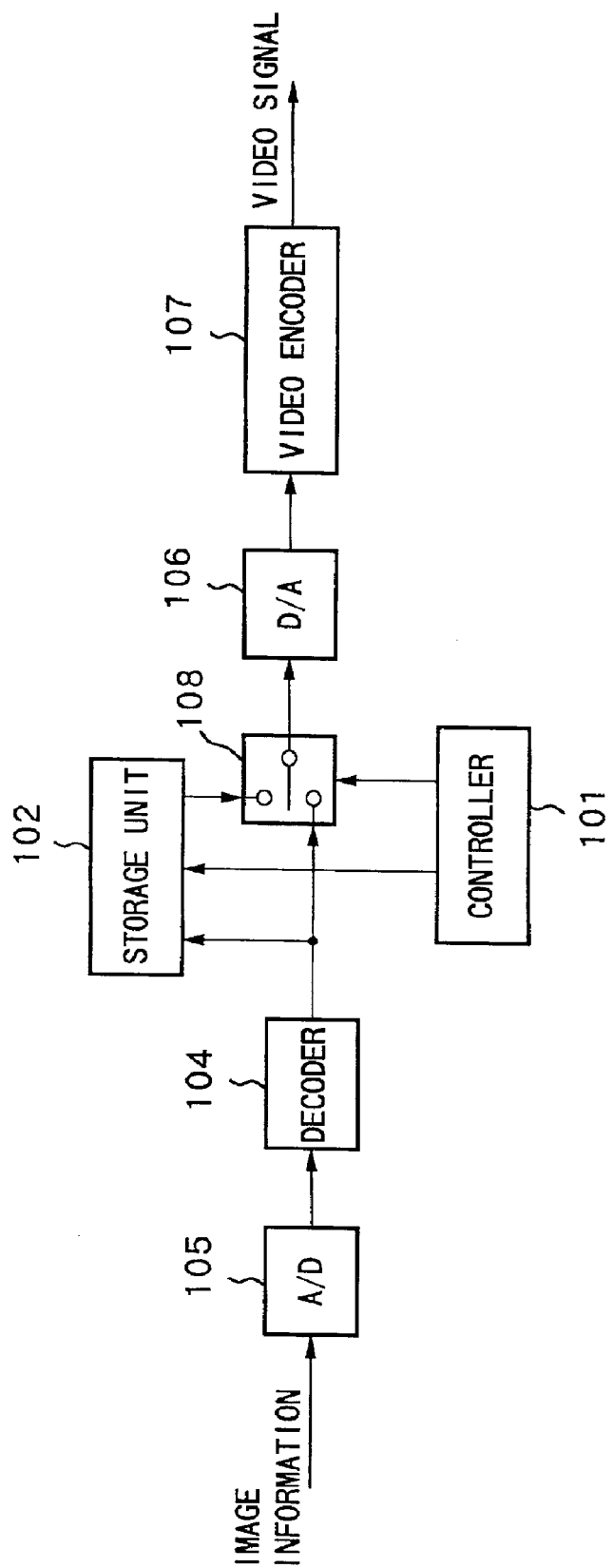
FIG. 1 is a block diagram illustrating a basic configuration of an image processing apparatus according to a first embodiment of the present invention.

FIG. 1 is a block diagram illustrating a basic configuration of an image processing apparatus according to the first embodiment of the present invention. The image processing apparatus includes an A/D converter 105 for converting input image information to digital image signals, a decoder 104 which performs processes, such as γ correction, noise reduction, and timing adjustment, on the digital image signals for extracting valid data (will be explained later), a storage unit 102 for storing a frame of the extracted digital image signals, a D/A converter 106 for converting the digital image signals into analog-image signals, a video encoder 107 for generating video signals from the analog image signals, a switch 108 for selecting either the output from the storage unit 102 or the output from the decoder 104, and a controller 101 for controlling the overall operation of the image processing apparatus.

Note, data flows which is read and written to and from the storage unit 102 are represented by three data lines in FIG. 1 for an explanatory purpose; however, since a single-port memory device is used as the storage unit 102 in the first embodiment, data is inputted to and outputted from the storage unit 102 via a single bidirectional data line in practice.

Next, an operation of the image processing apparatus having the aforesaid configuration is explained.

In the aforesaid configuration, when writing image data to the storage unit 102, the switch 108 selects the output from the decoder 104, thereby new image data is inputted to the storage unit 102 while the same image data is transferred to the D/A converter 106 simultaneously, and the image data, which is currently written in the storage unit 102, is displayed on a display device which is connected in the downstream to the video encoder 107.

By inputting image data of one frame to the storage unit 102 as described above, the image data in the storage unit 102 is updated. Then, by the beginning of the next frame period (field sequence), the switch 108 is changed to select the output of the storage unit 102. In this manner, two still images are consecutively displayed in the display device. Further, since an image sensing system for reading an original image and providing image signals to the A/D converter 105 can be put in a stand-by state until it is designated to read another image, electric power is saved.

Figure 2:
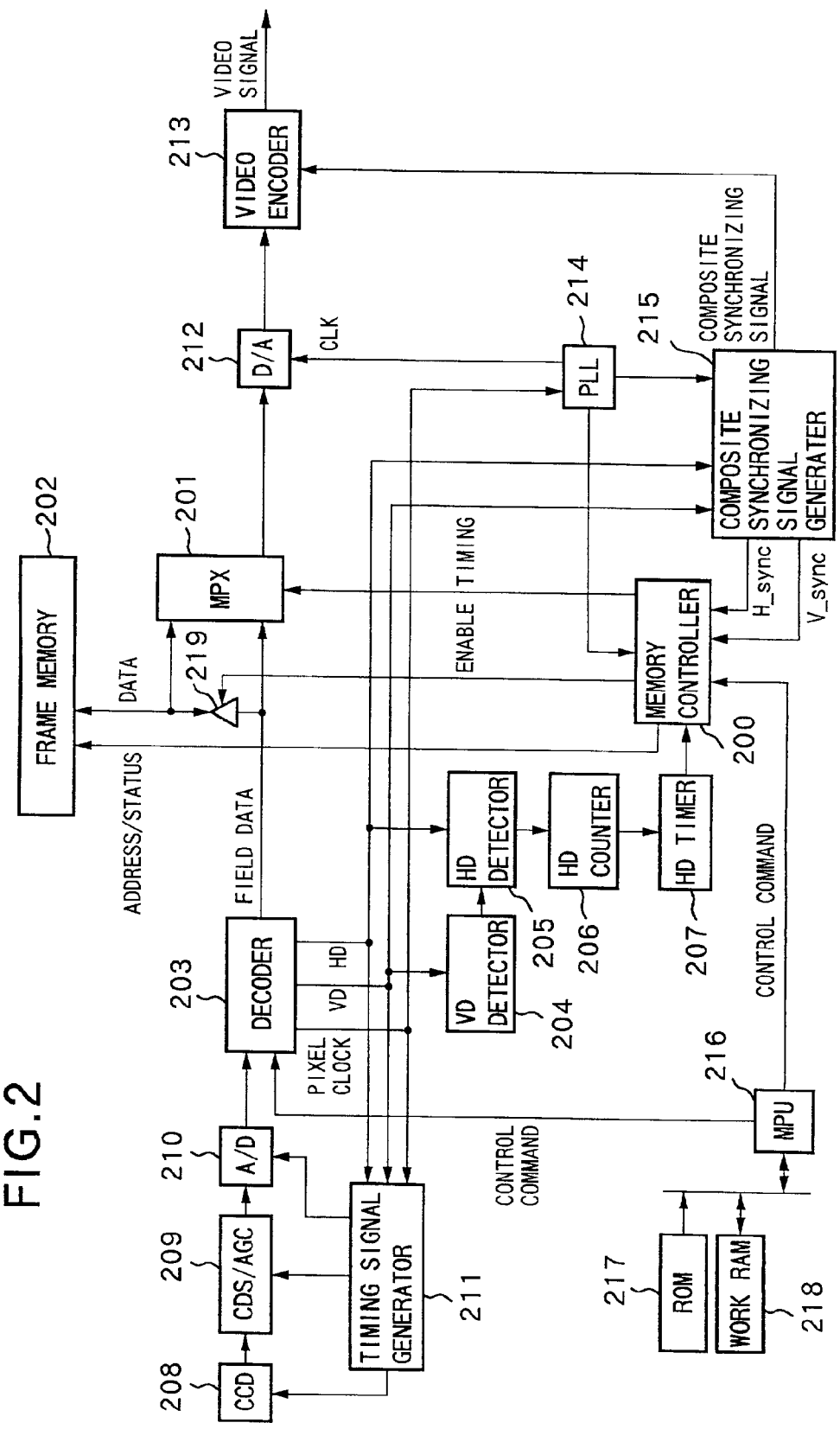
FIG. 2 is a block diagram illustrating a configuration of an APS film player according to the first embodiment of the present invention.

FIG. 2 is a block diagram illustrating an APS film player as an example of an apparatus using the image processing apparatus having the aforesaid basic configuration according to the first embodiment of the present invention.

Below, the APS film player, which uses one single-port RAM as frame memory, capable of updating an image stored in the frame memory while keep displaying an image with a simple configuration is explained.

Referring to FIG. 2, an image sensing device (CCD) 208 scans a film, such as the film 1102 shown in FIG. 23, and the obtained image data is pre-processed by a correlated double sampling (CDS)/automatic gain control (AGC) processing unit 209. Correlated double sampling is a technique to cancel out differences between charges (potentials) of respective elements of the CCD, and the automatic gain control is for automatically controlling the gain to be applied to a signal. Image information represented by electric signals are digitized by an A/D converter 210.

A decoder 203 generates digital data array (code array) having a frame format in which the digitized image information is synchronized. The decoder 203 also outputs synchronizing signals (horizontal synchronizing pulses (HD), vertical synchronizing pulses (VD), and pixel clock) for the frame format. In the image sensing system, a timing signal generator 211 takes the synchronizing signals, and generates and outputs a frame timing signal and a pixel timing signal to establish synchronization in the image sensing system.

Further, image data is written to frame memory 202 in synchronization with the synchronizing signals outputted by the decoder 203. The frame memory 202 is configured with one single-port RAM, and controlled by an address/status signal outputted from a memory controller 200. The memory controller 200 controls timing of storing valid image data on the basis of timing information obtained via a VD detector 204 and an HD detector 205 for synchronizing with the image sensing system, an HD counter 206 for detecting a time when the valid image data starts, and an HD timer 207 for detecting the beginning of a valid pixel in the horizontal direction, on the basis of the HD and VD outputted from the decoder 203.

The valid image data is data representing an image excluding a surrounding portion of the image, since the CCD 208 is usually designed to sense an area wider than the image itself. Further, the valid pixel is a pixel represented by the valid image data.

Data to be inputted to the frame memory 202 is the output from the decoder 203. Further, output data of the frame memory 202 is transferred via the same data bus used for inputting the data to the frame memory 202, and enters a multiplexer 201; accordingly, a three-state buffer 219 is used to prevent data from being conflicted. An enable signal for the three-state buffer 219 is also controlled by the memory controller 200. Further, the memory controller 200 also controls selection of inputs in the multiplexer 201 using a switching timing signal. Digital image information selected by and outputted from the multiplexer 201 is converted into analog signals by a D/A converter 212, further processed by a video encoder 213, which is in the downstream to the D/A converter 212, and changed into video signals carrying information of luminance, color, and synchronization. Thereafter, the video signals are outputted to a display device.

Clock timing of the D/A converter 212 and clock timing of the memory controller 2.00 are controlled in accordance with a phase-locked clock of a clock outputted from the decoder 203 in a phase lock loop (PLL) 214. Accordingly, either in a case where the output from the frame memory 202 or in a case where the output from the decoder 203 is selected and outputted from the multiplexer 201, a displayed image does not become out of synchronization.

A timing signal for the video signals outputted from the video encoder 213 is generated by a composite synchronizing signal generator 215. The generator 215 also generates a horizontal synchronizing signal H_sync and a vertical synchronizing signal V_sync in addition to a composite synchronizing signal which is the timing signal for the video signals. Accordingly, it is possible for the output of the video encoder 213 to correspond to the S terminal output (to output a luminance signal and a chrominance signal separately). The memory controller 200 and the decoder 203 receive control commands from MPU 216 by command reception buffers, and execute the commands in synchronization with timing of a frame of an image.

Figure 3:
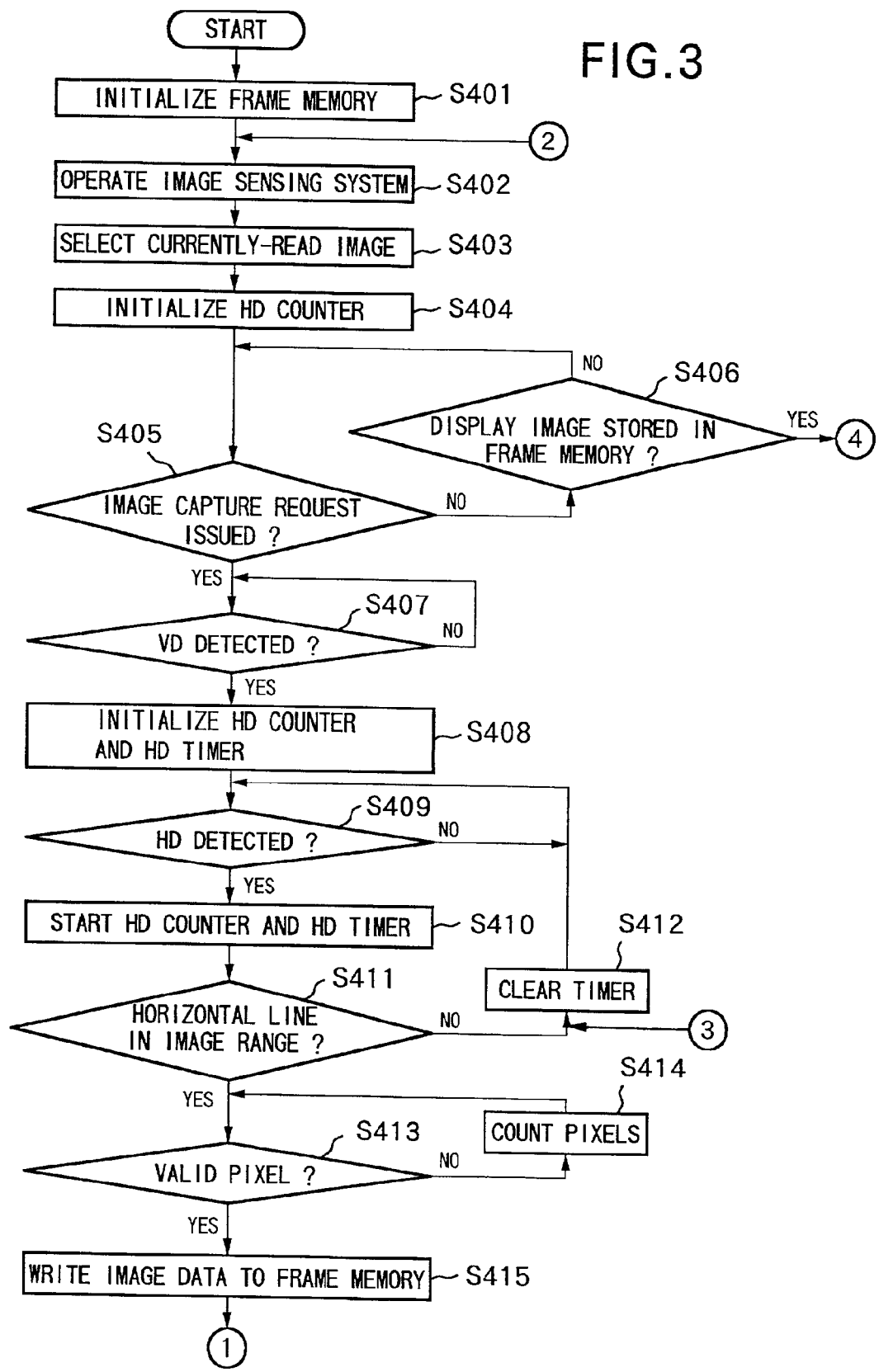
FIG. 3 is a flowchart of a control sequence of the APS film player shown in FIG. 2 according to the first embodiment of the present invention.
Figure 4:
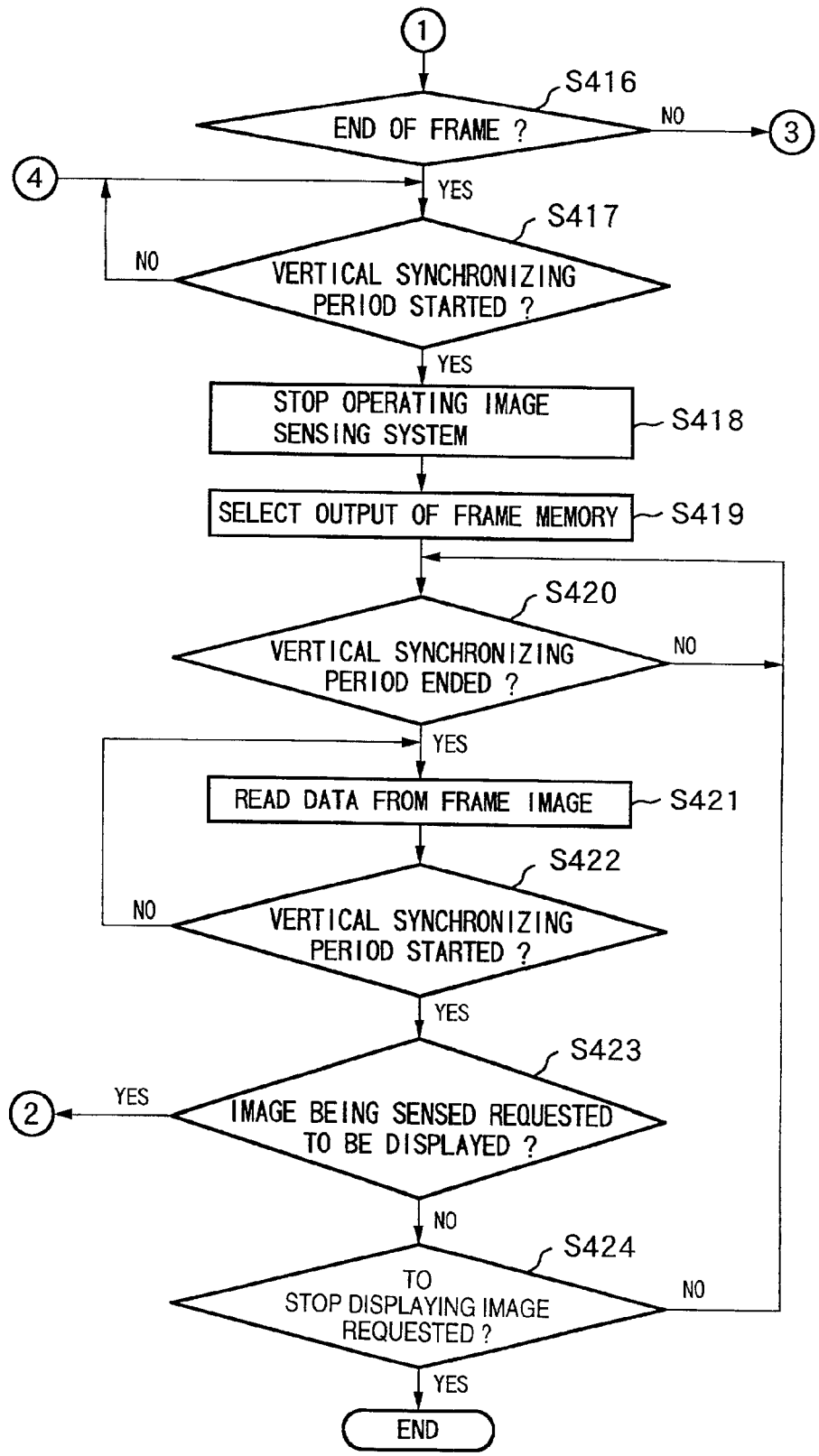
FIG. 4 is a flowchart of the control sequence of the APS film player shown in FIG. 2 according to the first embodiment of the present invention.

Reference numeral 217 denotes ROM where a control program, to be executed by the MPU 216, including a control sequence shown in FIGS. 3 and 4, which will be explained later, configured as a storage medium of the present invention. As for the storage medium, semiconductor memory, an optical disk, a magneto-optical disk, and a magnetic medium may be used, for instance. Further, reference numeral 218 denotes work RAM for temporarily storing results of operations executed by the MPU 216.

Next, the control sequence of the APS film player having the aforesaid configuration are explained with reference to FIGS. 3 and 4. After the control sequence starts, the frame memory 202 is initialized in step S401. This process may be skipped when it is not necessary. Thereafter, an image sensing system starts to operate to read a film image in step S402. Note, the image sensing system indicates a group of units which are synchronized in accordance with synchronizing signals generated by the timing signal generator 211, namely, the CCD 208, the CDS/AGC 209, and the A/D converter 210. The CCD 208 may be left functioning at all the time. The operation performed in step S402 is to illuminate a film image by a back light and read the film image so that the read film image can be captured (i.e., stored) by the frame memory 202.

When the read film image is ready to be captured, the multiplexer 201 selects the output from the decoder 203, namely, selects image signals of the film image which is currently being read, in step S403. At this time, the decoder 203 is optimized by the MPU 216 for capturing the film image. Then, in step S404, the HD counter 206 is initialized for generating a timing signal used to capture the film image. Thereafter, the process waits until a command for capturing an image (image capture command) is issued in step S405. In this stage, the film image is displayed on the display device. The image capture command is generated when a user inputs the command by operating a remote controller, for instance, while monitoring the image displayed on the display device. Further, there may be a case where the MPU 216 automatically issues the image capture command in a sequence of presentation.

Further, while the process waits for the image capture command, the image captured in the previous image capture operation may be displayed (i.e., the output of the frame memory 202 is selected) (YES in step S406). However, since no image data exists in the frame memory 202 soon after this processing is initiated, more specifically, until the first image is captured by the frame memory 202, a predetermined value is often written and developed in the frame memory 202 when initializing the frame memory 202 in step S401 so that a color pack is displayed when the multiplexer 201 switches to select the output from the frame memory 202 due to affirmation in step S406.

When an image capture command is issued in the step S405, in step S407, the VD detector 204 detects the VD signal which indicates the start timing of the next frame. The VD signal is a timing pulse indicative of the start timing of a vertical return period, and, by detecting the timing pulse, start and end of the vertical return period can be determined. When the end of the vertical return period is detected, the HD counter 206 and the HD timer 207 are initialized in step S408, then wait for the HD signal in step S409. Note, the initialization of the HD counter 206 and the HD timer 207 may be performed while waiting for the VD signal in step S407.

The HD signal is a pulse synchronized with a horizontal return period, which is generated for each horizontal scanning line, and the start time of each horizontal scanning operation is determined from the pulse. As the HD detector 205 detects the HD signal, the HD counter 206 and the HD timer 207 start operating in step S410. Next in step S411, the value of the HD counter 206 is compared to a predetermined value to determine whether or not the current row is in the range of the image. In a practical frame (field) configuration, image information starts after several horizontal scanning lines are passed since the end of the vertical return period. Accordingly, it is necessary to set the predetermined value in consideration of the aforesaid fact. In this case, the predetermined value is determined on the basis of the characteristics of the CCD 208.

If the current row is not within the image range (NO in step S411), the HD timer 207 is cleared in step S412 and the process waits for the next detection of the HD signal in step S409. If the current row is in the image range (YES in step S411), then whether or not a current pixel is a valid pixel, which carries image information, in the horizontal scanning line is determined in step S413. The process of step S413 is performed since there are several pixels before a pixel indicative of image information starts after the end of the horizontal return period. Further, in a case of discarding pixels so as to fit the size of the read image to the capacity of the frame memory 202, the position of the valid pixel should be determined in consideration of the number of pixels to be discarded. Until the pixel position reaches the position of the valid pixel, the HD timer 207 counts the number of clocks, which corresponds to the number of pixels, in step S414.

After the valid pixel is detected, output data from the A/D converter 210 is written into the frame memory 202 via the decoder 203 in steps S415 and S416. In the first embodiment, the read image, i.e., the same output data from the decoder 203, is selected by the multiplexer 212 and displayed in the display device while writing the output data to the frame memory 202. Accordingly, images are displayed without a break, even during reading and writing a new image to the frame memory 202.

By directly displaying the read image for a frame period while simultaneously writing the same image to the frame memory 202, the content of the frame memory 202 is updated. Then, when the scanning of the current frame is completed (i.e., when the ends of an odd field and an even field are detected by the memory controller 200) and a vertical synchronizing period starts in step S417, then the image sensing system is stopped in step S418. In the process in step S418, the back light is turned off, and peripheral devices are disabled, although the CCD 208 may be left functioning; namely, output data from the CCD 208 is invalidated in step S418. Then, in step S419, the multiplexer 201 switches to select the output data from the frame memory 202. At this time, the three-state buffer 219 is disabled to make the data bus from the decoder 203 to the frame memory 202 to high impedance.

The V_sync signal and the H_sync signal used for synchronizing the display device are generated by the composite synchronizing signal generator 215 at the same time the generator 215 generates the composite synchronizing signal, and inputted to the memory controller 200 where timing of vertical synchronization and horizontal synchronization is utilized. When the start of the next frame is detected by detecting the end of the current vertical synchronizing period in step S420, data stored in the frame memory 202 starts being read in step S421. The memory controller 200 outputs an address/status signal in synchronization with the H_sync signal so that corresponding pixel data is read.

The memory controller 200 determines the end of the current field by detecting the start of the next vertical synchronizing period in step S422, and controls to switch the selection of the outputs by the multiplexer 201 when required. In step S423, if a control command instructing the display of an image being sensed by the CCD 208 is issued by the MPU 216, then the process returns to step S402. Further, if a command to stop displaying the image is issued (YES in step S424) (e.g., in order to display a menu image composed of superimposition and color background prepared independently), output of the image from the frame memory 202 is stopped. If no command to stop displaying the image is issued (NO in step S424), the process returns to step S420 and the image outputted from the frame memory 202 is kept displayed.

For outputting color background, it is possible to control the video encoder 213 to output a fixed value, or to provide a video switch (not shown) which switches between the output from the video encoder 213 and a fixed value. Regarding an on-screen display device (not shown) used for superimposition, it may be provided between the D/A converter 212 and the video encoder 213, or downstream from the video encoder 213.

According to the first embodiment as described above, in the image processing apparatus, which is for outputting video signals to be displayed on the basis of input still image information, having the A/D converter 105 for obtaining digital image signals, the decoder 104 for extracting effective data out of the digital image signals, the storage unit 102 for storing one frame of the extracted digital image signals, the D/A converter 106 for converting the digital image signals into analog image signals, and the video encoder 107 for generating video signals from the analog image signals, the switch 108 for selecting either the output from the storage unit 102 or the output from the decoder 104, and the controller 101 for controlling the overall flow of data as well as controlling the switch 108 are provided. Accordingly, the content of the frame memory 202 is updated by a new image without considering video synchronizing periods as well as without a break in displaying of an image.

Figure 27:
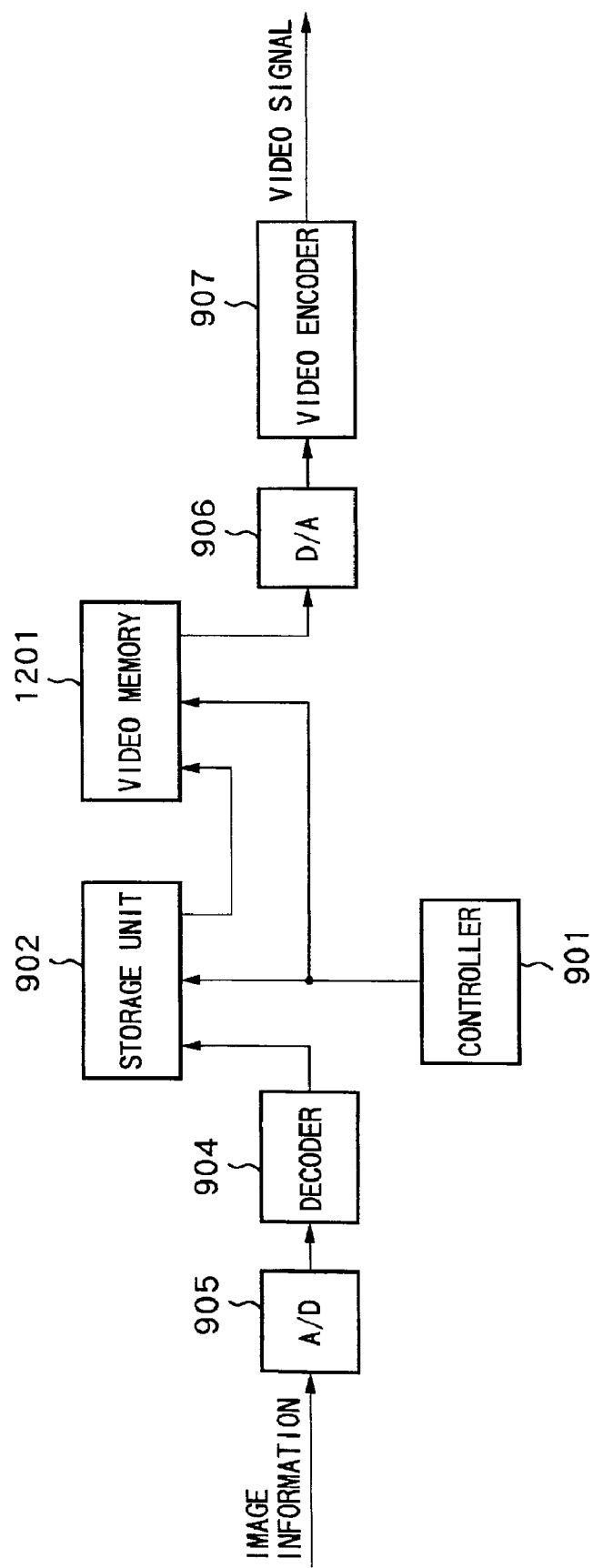
FIG. 27 is a block diagram illustrating a main portion of a conventional image processing apparatus.
Figure 28:
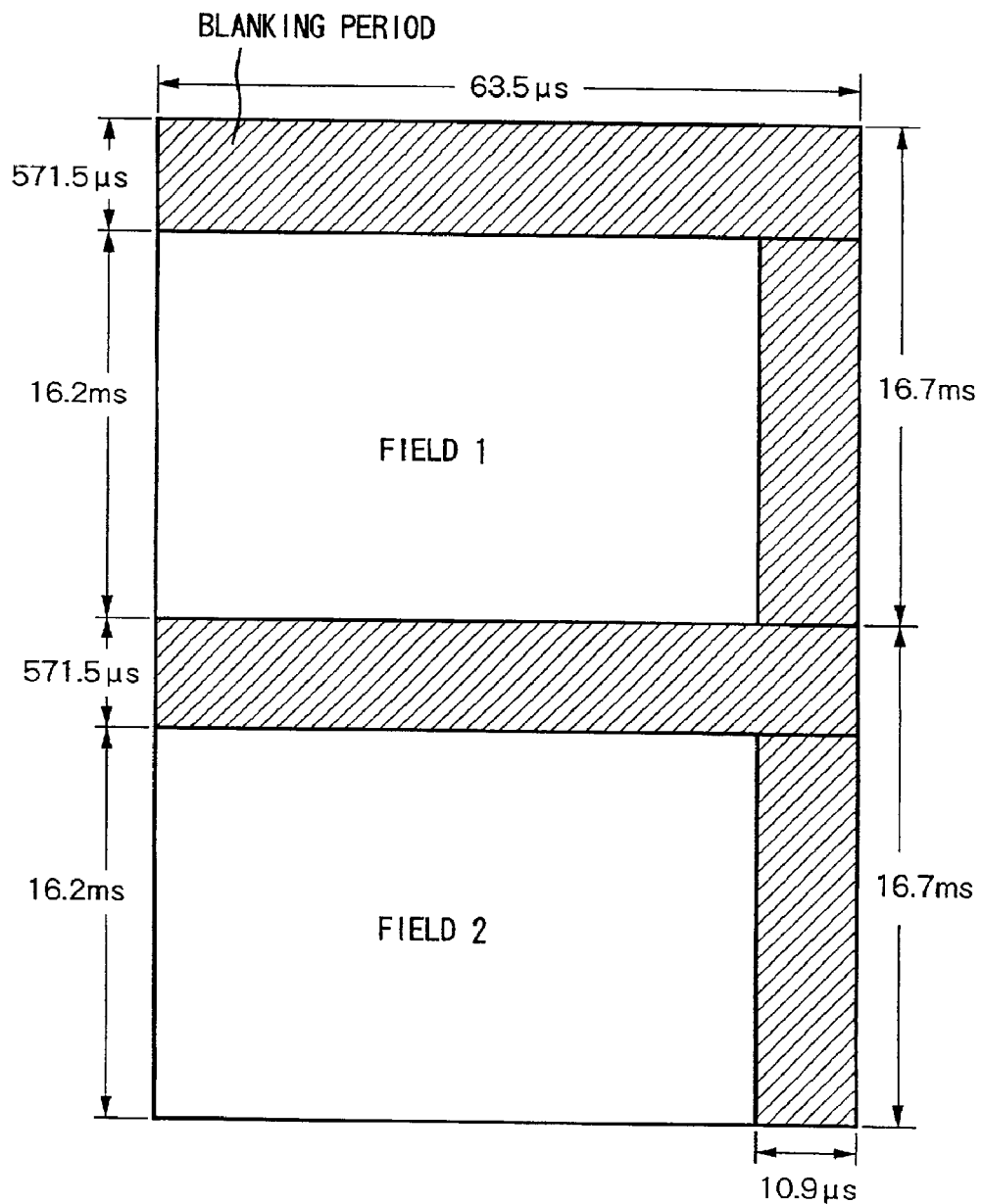
FIG. 28 is a view for explaining displaying timing of a frame image.

Further, with the aforesaid configuration and operation, it is possible to obtain the same effect realized by the storage unit 902 and the video memory 1201, shown in FIG. 27, of the prior art, using one single-port memory. Accordingly, the image processing apparatus can be made at a low cost. Further, it is possible to update the content of the storage unit 102 while displaying an image which is written into the storage unit 102, without being limited to the video synchronizing periods, thus different from the prior art; therefore, a displayed image is changed without keeping a user, who instructed to change the images, waiting, thus it is possible to provide a user interface of the apparatus in the best condition.

Although the aforesaid image processing apparatus may be configured using one single-port RAM, there are cases where a plurality of single-port RAMs are necessary for storing a plurality of images and performing various processes on the images (e.g., a case of consecutively displaying a plurality of images as in a slide show). In such cases, updating of an image in each RAM is performed in the same processing sequence as described above, and the obtained advantages are also same as above. By independently controlling a plurality of single-port RAMs, a circuit can be simplified comparing to a case of using dual-port memory.

Second Embodiment

Next, an image processing apparatus, e.g., a film player, according to the second embodiment is explained with reference to FIG. 5.

Figure 26A:
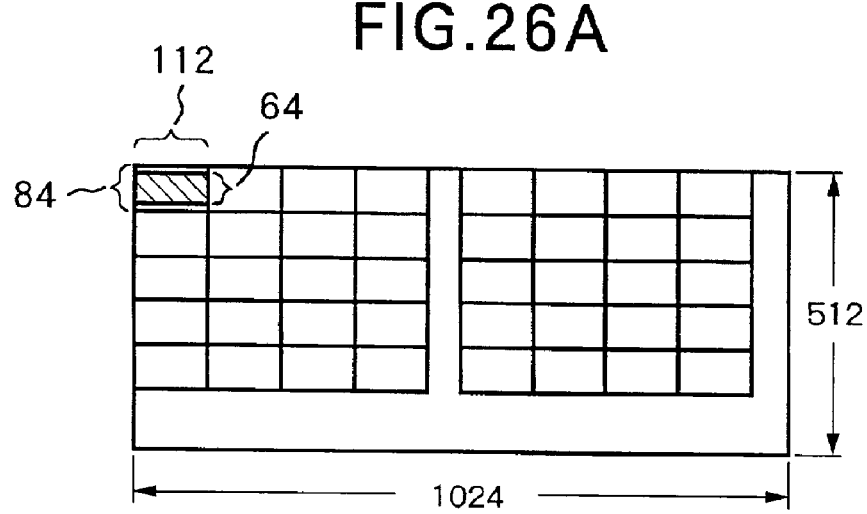
FIG. 26A is a view showing an example of an index image of all the images on a film.
Figure 26B:
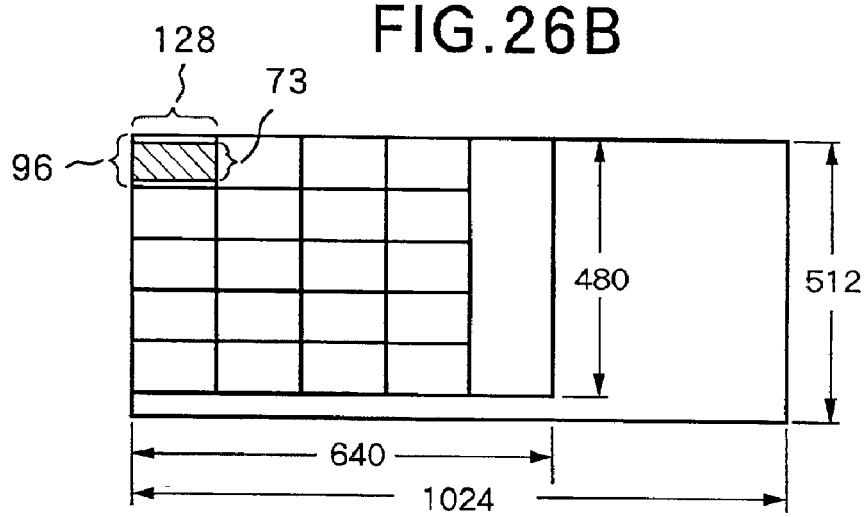
FIG. 26B is a view showing an example of an edited index image.
Figure 26C:
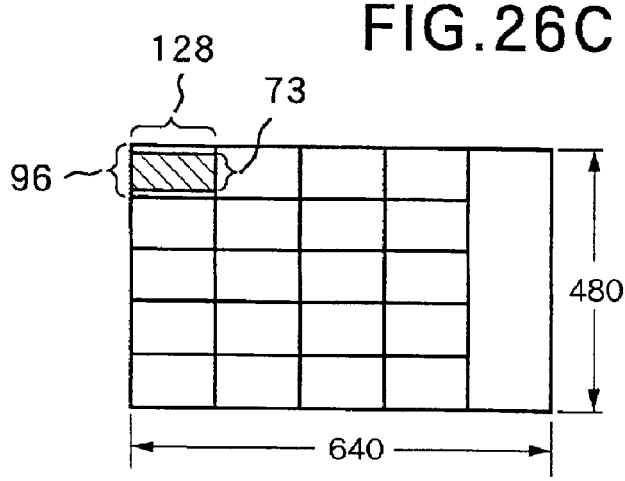
FIG. 26C is a view showing an example of a displayed index image.

In the second embodiment, a method of generating an index image while displaying it using single-port memory is explained. The index image includes a plurality of thumbnail images read from the film 1102 (FIG. 23) arranged in the format as shown in FIG. 26C. For generating the index image, images read from the film 1102 are reduced, one by one, to generate thumbnail images, and arranged sequentially in memory as each thumbnail image is generated.

For displaying the index image while generating and arranging the thumbnail images, a plurality of single-port memories are necessary. Even so, since the single-port memories can be controlled independently, the configuration of the apparatus is greatly simplified comparing to a case of using video RAM or dual-port memories for said exclusive use. For the explanatory sake, a method of generating each thumbnail image while temporarily displaying the full original image stored in one single-port memory, then displaying an index image after all the thumbnail images are arranged in respective areas of the index image is explained in the second embodiment.

Figure 5:
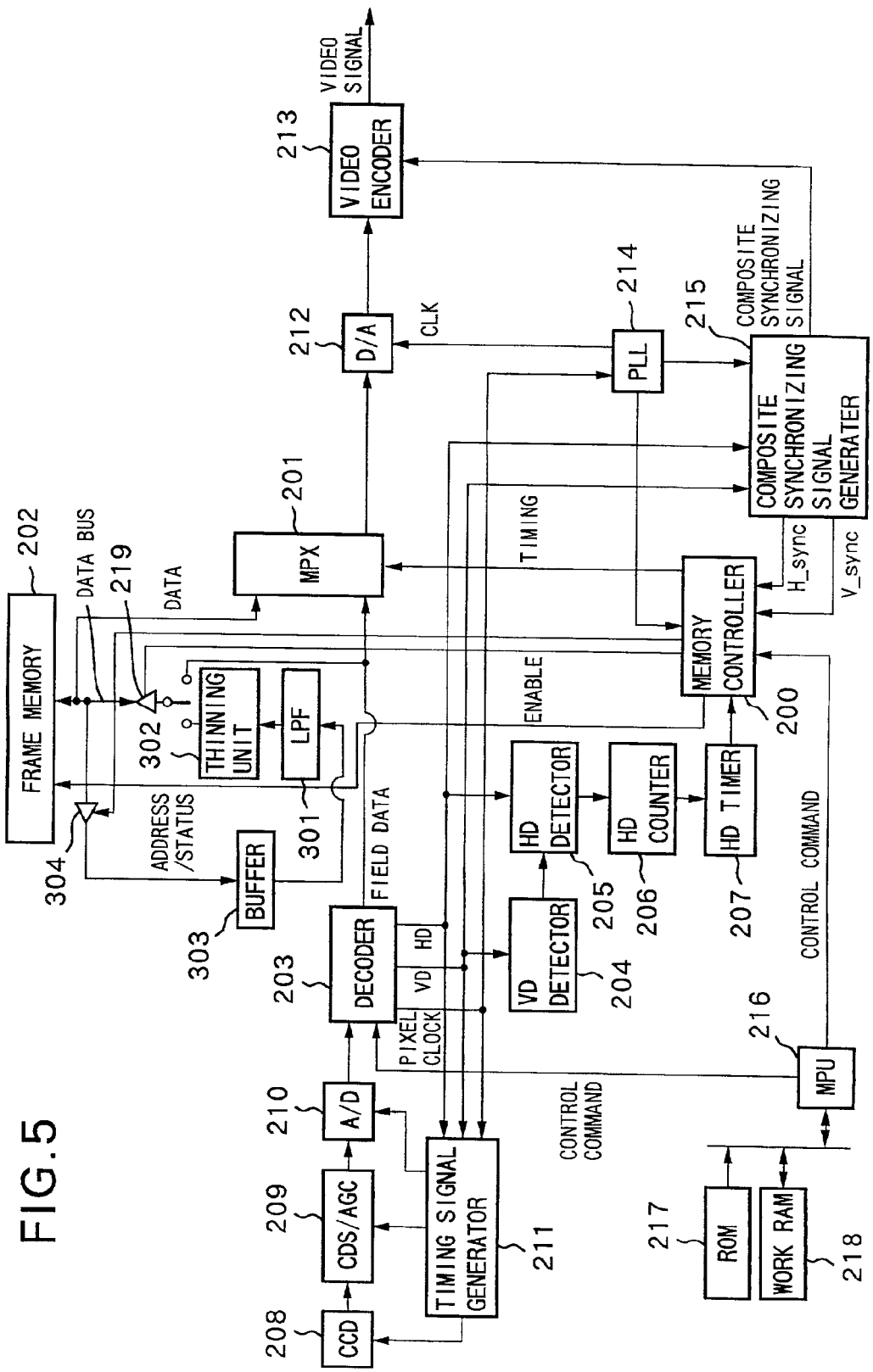
FIG. 5 is a block diagram illustrating a configuration of an image processing apparatus according to a second embodiment of the present invention.

The units and elements in FIG. 5, except a low-pass filter (LPF) 301, a thinning unit 302, a buffer, 303, and a three-state buffer 304, are the same as those shown in FIG. 2; therefore, explanation of them are omitted. The LPF 301, the thinning unit 302, the buffer 303, and the three-state buffer 304 are for generating a thumbnail image, thus, when outputting a full frame image (i.e., the image is not to be reduced), the LPF 301 and the thinning unit 302 are disconnected by switching between the thinning unit 302 and the three-state buffer 219. At this time, the three-state buffer 304 provided between data bus of the frame memory 202 and the buffer 303 should be disabled.

The reduction processing is to reduce the number of pixels of an image, and equivalent to lowering the sampling frequency. Therefore, in order to prevent aliening distortion, it is necessary to limit the frequency range allowable at the current sampling frequency. The LPF 301 is a filter for this purpose. By reducing data which passed the LPF 301, an image is reduced. The thinning unit 302 is for reducing the image, and, when a displayed reduced image is not expected to have high quality, pixels may be simply thinned out, otherwise, operation between adjoining pixels may be added to the thinning out operation.

The buffer 303 is for temporally storing data, a part of the content in the frame memory 202, to be processed by the LPF 301 and the thinning unit 302. Generally, any available DRAM may be used as the frame memory. If the capacity of the RAM is 16 Mbits, for instance, three frames of 640×480 square pixels (eight bits each for color difference signals and a luminance signal of one pixel) can be stored. The RAM is divided into partitions, and image data which is currently read from the film 1102 is stored in one of the partitions, a part of the image data is down-loaded to the buffer 303 and reduced, then the obtained thumbnail image is stored in another partition of the RAM. By reducing desired film images into thumbnail images and storing them in another partition, then reading out image data from the other partition and outputting it to a display device, an index image is displayed.

Figure 6:
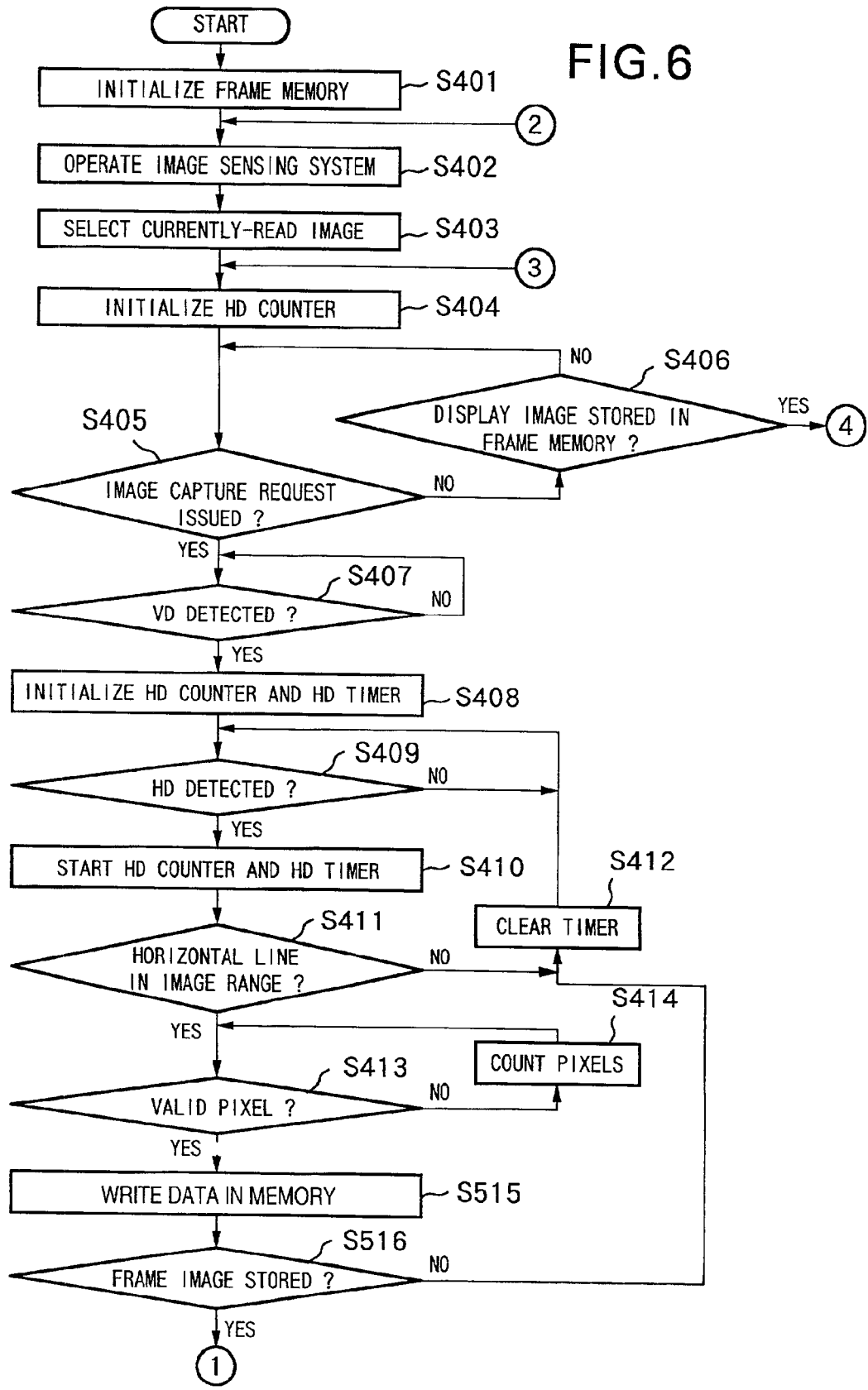
FIG. 6 is a flowchart of a control sequence of the image processing apparatus shown in FIG. 5 according to the second embodiment of the present invention.
Figure 7:
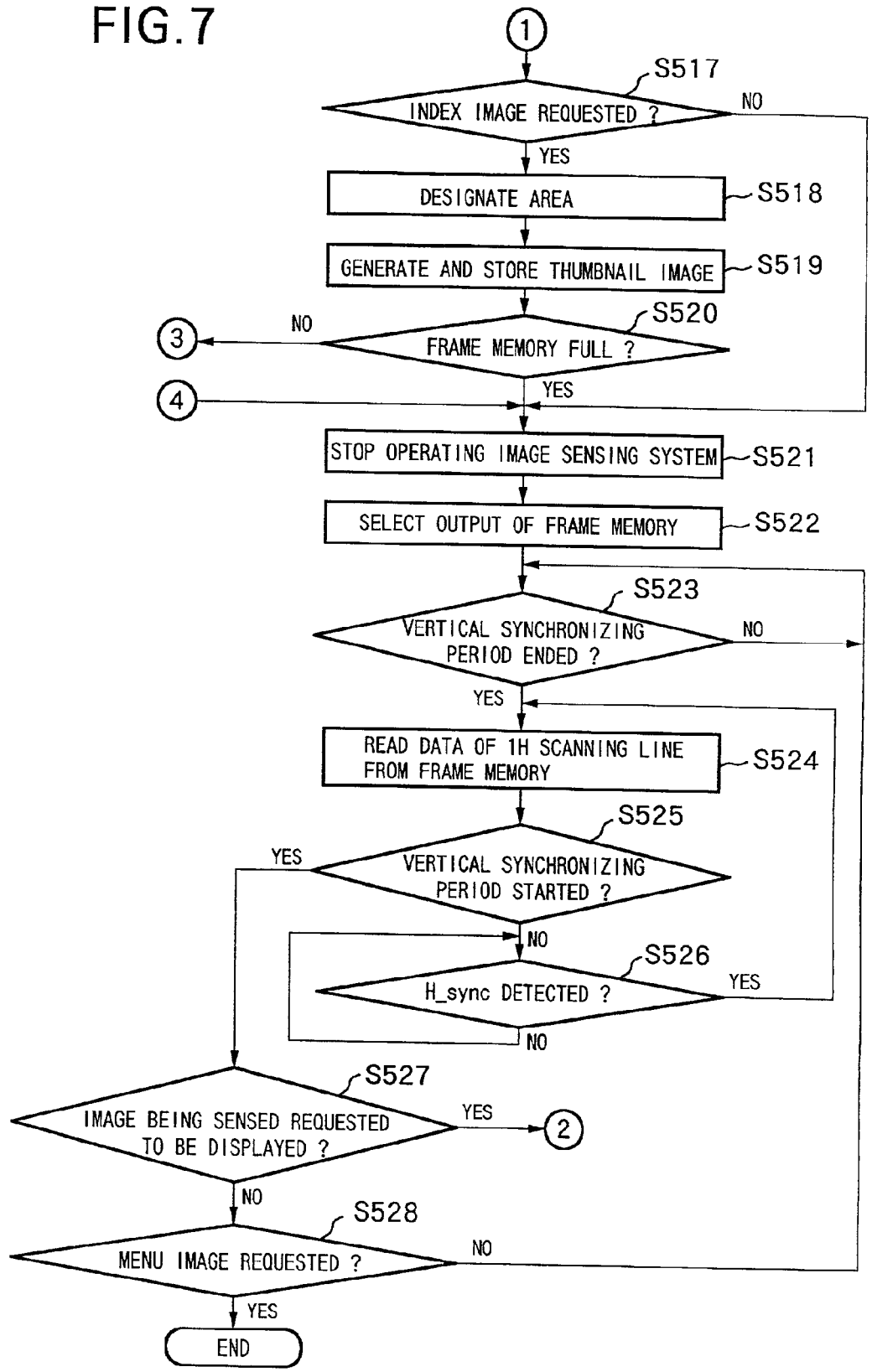
FIG. 7 is a flowchart of the control sequence of the image processing apparatus shown in FIG. 5 according to the second embodiment of the present invention.

FIGS. 6 and 7 are flowcharts showing a control sequence of the image processing apparatus having the aforesaid configuration according to the second embodiment, and program codes corresponding to respective steps are stored in the ROM 217. In FIG. 6, the same processes as those shown in FIG. 3 are referred to by the same step numbers, and explanations of them are omitted.

It is assumed that, by the process of step S515, a user has selected whether or not to display an index image using a remote controller, and the MPU 216 has issued a control command to the memory controller 200. Both in a case of displaying a single image and a case of displaying an index image, processes from sensing an image for preparing to write the sensed image to the frame memory 202 are the same. The frame memory 202 is divided into a plurality of partitions, as described above. One of the partitions is assigned to store a frame image. After a frame image is stored in the partition (YES in step S516), in a case where the control command from the MPU 216 is not to instruct to display an index image (NO in step S517), the process proceeds to step S521.

If the control command from the MPU 216 is to instruct to display an index image (YES in step S517), then an area where a thumbnail image is to be stored is designated in step S518, and a thumbnail image is generated and stored using the units 301 to 304 in step S519. The area designated in step S518 is where in a frame area (e.g., in 640×480 pixels) the thumbnail image is to be arranged. In the index image generating processing, until all the desired thumbnail images are arranged (e.g., until the area, having a maximum capacity of storing a frame image, reserved for storing an index image becomes full), the processes of step S504 to S520 are repeated.

When the desired thumbnail images are stored, it should be in a vertical synchronizing period for scanning by the CCD 208 and scanning the display. During this period, the image sensing system is stopped, and an image stored in the frame memory 202 starts being displayed in the next frame (field) period. The concept of stopping the image sensing system is the same as that explained in the first embodiment. Further, when the process moves from the step S406 to step S521, the image sensing system is stopped during the vertical synchronizing period.

In step S522, the multiplexer 210 switches the selection from the output of the decoder 203 to the output from the frame memory 202. Thereafter, the process waits for the end of the vertical synchronizing period in step S523. After the vertical synchronizing period ends and the next field period for scanning the display device starts, the data read from the frame memory 202 is converted into video signals by the video encoder 213. In the second embodiment, data is read for one horizontal scanning line in step S524, and the reading of the data is repeated until the next vertical synchronizing period starts (steps S525 and S526). Note, although it is not shown in FIG. 4, the processing as described above is also performed in the first embodiment. After the next vertical synchronizing period starts, the image to be displayed in the next frame period is checked. If the image to be displayed in the next frame period is a new image read by the CCD 208 (YES in step S527), then the process returns to step S402 and the image sensing system starts being operated. If it is requested to display a menu image (YES in step S528), then the process proceeds to another processing of displaying a menu image. Otherwise, it is determined that the image currently displayed is to be displayed in the next frame period, and the process returns to step S523 and the processes of steps S523 to S528 are repeated.

According to the second embodiment as described above, in addition to the same effects realized by the first embodiment, it is possible to generate an index image by dividing a memory into a plurality of areas, storing an input image to one of those areas, reducing the image, and storing the reduced image into another area of the memory.

Third Embodiment

Next, the third embodiment of the present invention will be explained in detail with reference to FIGS. 8 to 17.

In the third embodiment, a case of rotating an image as shown in FIG. 29 will be explained. In switching to display a rotated image, change over from a currently displayed image to the rotated image can be accomplished smoothly by changing the images at a start timing of a new frame (or a new field). In the third embodiment of the present invention, an image processing apparatus capable of changing a displayed image to a rotated image smoothly as well as developing a rotated image to be displayed next while displaying an original image using a general-purpose memory, without a video RAM for exclusive purpose is explained.

Figure 8:
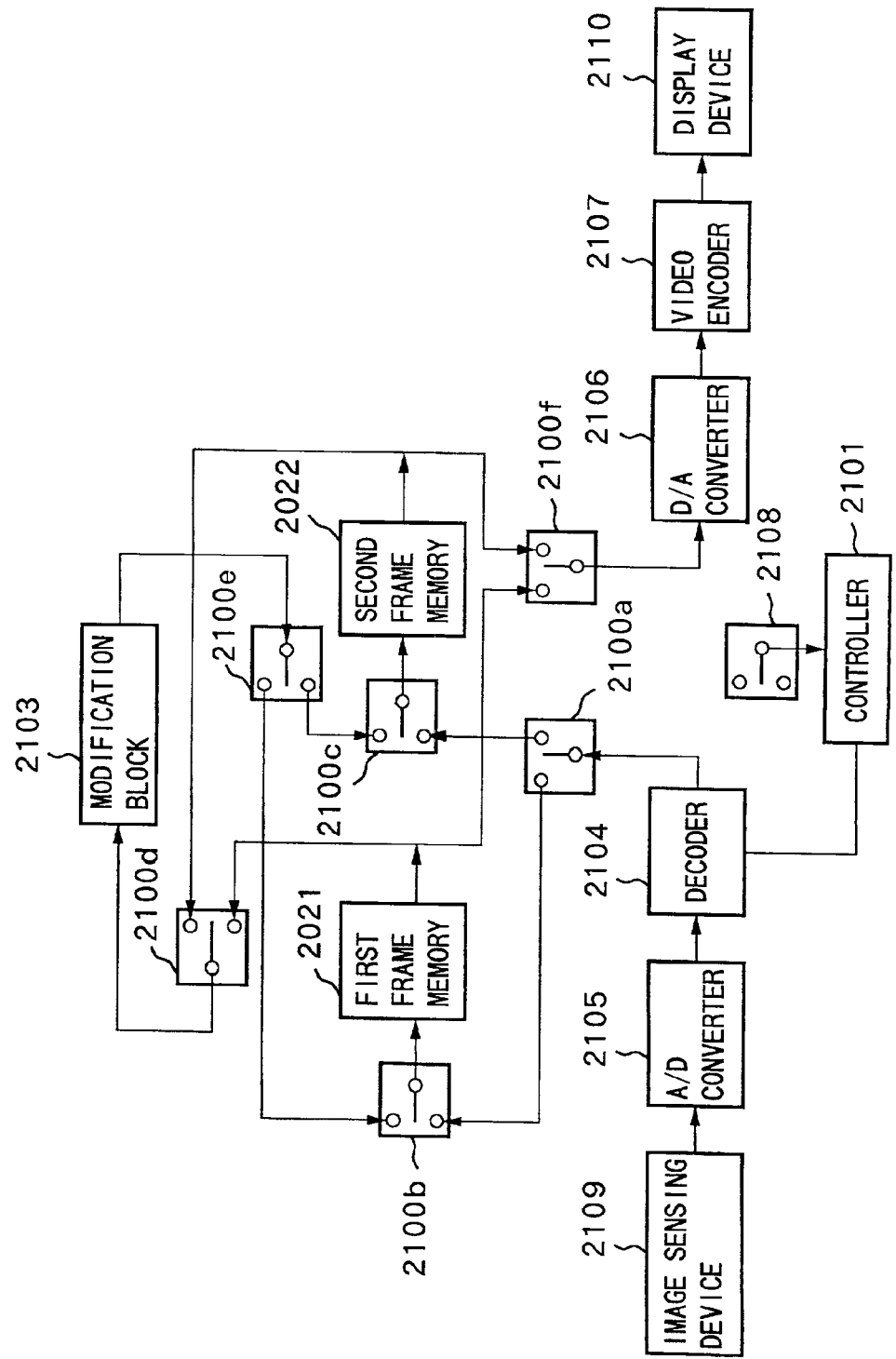
FIG. 8 is a block diagram illustrating a configuration of an image processing apparatus according to third and fourth embodiments of the present invention.

FIG. 8 is a block diagram illustrating a configuration of an image processing apparatus according to the third embodiment of the present invention. The image processing apparatus includes path selectors 2100a to 2100f, a controller 2101, a modification block 2103, a decoder 2104, an A/D converter 2105, a D/A converter 2106, a video encoder 2107, first frame memory 2021, and second frame memory 2022. Further, reference numeral 2108 denotes a switch for controlling the respective path selectors 2100a to 2100f; 2109, an image sensing device, such as a CCD; and 2110, a display device.

Referring to FIG. 1, the image sensing device 2109 receives light from a still image and converts the received light into electric signals. The A/D converter 2105 converts the electric signals inputted from the image sensing device 2109 into digital image information. The decoder 2104 performs various processes for forming video signals (video signal processing) on the output from the A/D converter 2105. The controller 2101 performs settings of the decoder 2104, status control (not shown) of the first and second frame memories 2021 and 2022, and control of the path selectors 2100a to 2100f as will be described in flowcharts shown in FIGS. 10 to 13. The D/A converter 2106 converts digital data into analog data to be displayed, and the video encoder 2107 outputs video signals having a format of, e.g., NTSC composite signals.

The first and second frame memories 2021 and 2022 are two different memory areas which are controlled separately. To each of the first and second frame memories 2021 and 2022, the path selectors 2100d and 2100e for independently outputting data and returning the data into the respective memories are connected. The modification block 2103 is provided between the path selectors 2100d and 2100e, which develops an image. The path selectors 2100b and 2100c select either new image data which is obtained by converting input image information into digital image data by the A/D converter 2105 and applying video signal processing to the digital image data by the decoder 2104, or developed data via the modification block 2103, and input the selected data to the first and second frame memories 2021 and 2022, respectively. The display device 2110 displays output data for display. Note, the display device 2110 may be included in the image processing apparatus or may be provided outside of the image processing apparatus.

The path selector 2100a selects either the first frame memory 2021 or the second frame memory 2021 for inputting new image data. The path selector 2100f selects either the output from the frame memory 2021 or the output from the frame memory 2022 to be inputted to the D/A converter 2106 as a source used for generating data to be displayed. The selected output is converted into analog data by the D/A converter 2106, then formed into video signals having a format of, e.g., NTSC composite signals, by the video encoder 2107.

Note that, in FIG. 8, two memories for storing images, namely, the first and second frame memories 2021 and 2022, which can be controlled independently are used; however, the number of memories is not limited to two, and more than two memories of this kind may be provided. Further, if the manufacture cost is not considered, dual-port memory may be used. However, for reducing the manufacture cost, DRAM is preferably used as the first and second frame memories 2021 and 2022. Further, if noises in lower bits, which can not be removed by the decoder 2104, are added to input data when the input data is converted to digital data, a circulating-type noise reduction mechanism is necessary. In such a case, if data is to be inputted to and outputted from memory at a multiplicity of a sampling rate, for instance, it is best to use synchronous dynamic RAM (SDRAM).

Figure 9:
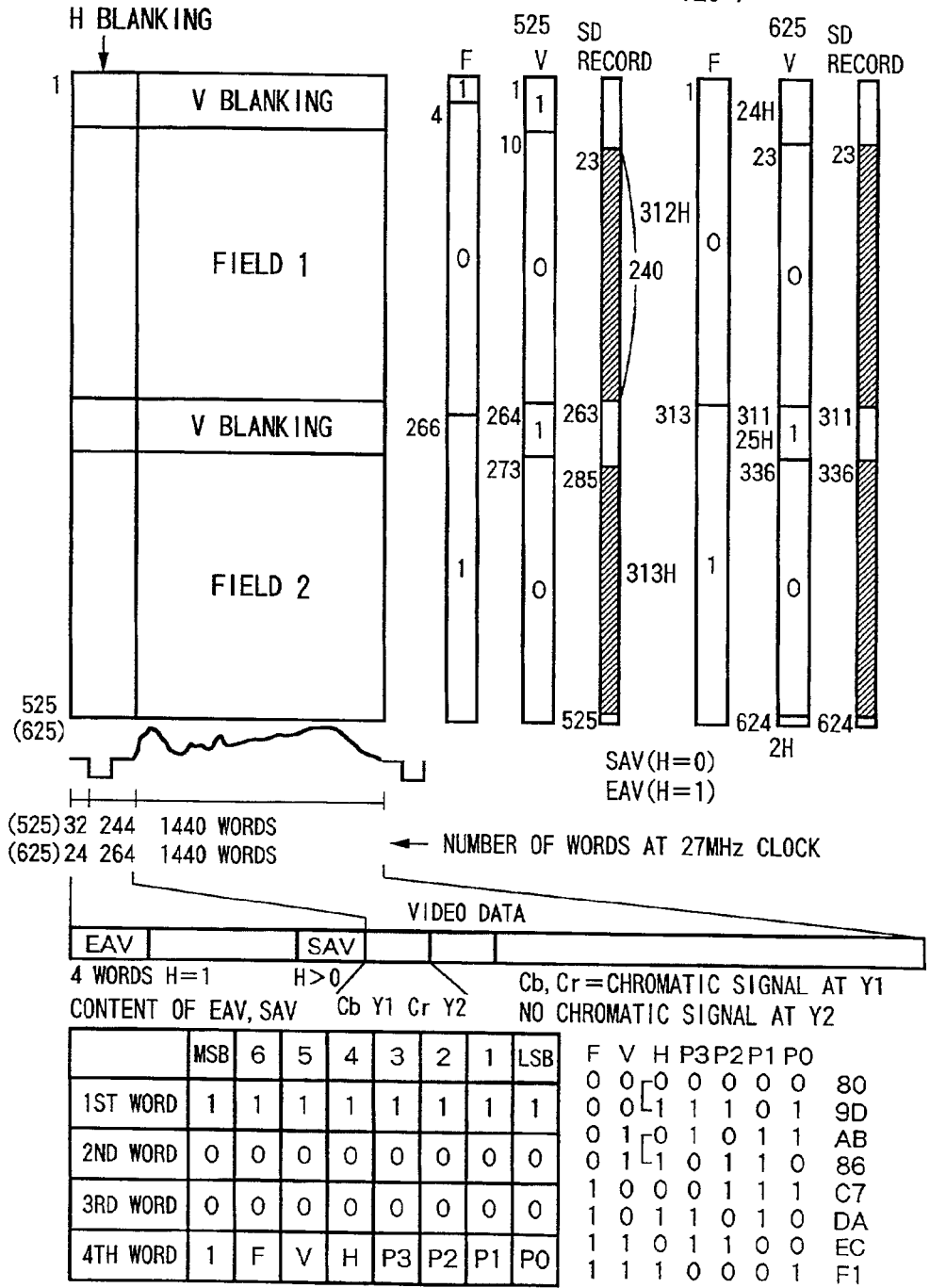
FIG. 9 is an explanatory view the 656 format recommended by the International Telecommunication Union.

Further, in the configuration as shown in FIG. 8, image data is converted to analog data by the D/A converter 2106, then encoded to video signals (analog) by the video encoder 2107; however, it is possible to output image data in a digital component video signal format as shown in FIG. 9, and a decoder for exclusive use for decoding the data in the aforesaid format may be provided. FIG. 9 shows the 656 format recommended by the International Telecommunication Union (ITU, previous CCIR), and more specifically, Interlaces for Digital Component Video Signals in 525-Line and 625-Line Television System Operating at the 4:2:2 Level of Recommendation 601. Thus, the present invention is applicable to comply with the Recommendation 601. Further, the present invention is applicable to any image data format for display regardless of the format, digital or analog.

Figure 10:
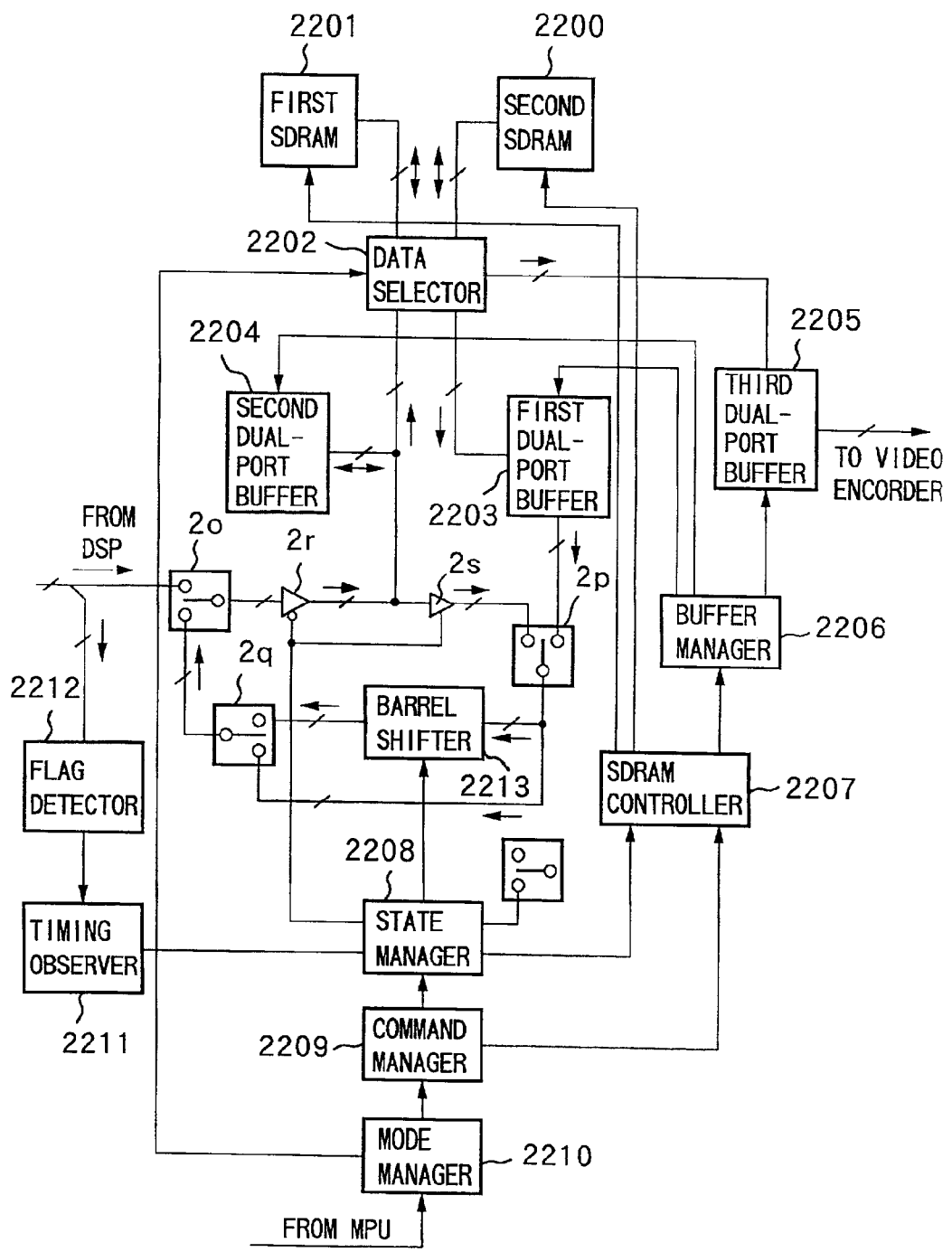
FIG. 10 is a block diagram illustrating a configuration of a main portion of the image processing apparatus according to the third embodiment of the present invention.

FIG. 10 is a block diagram illustrating a configuration of a unit, between the decoder 2104 and the D/A converter 2106, shown FIG. 8, of the image processing apparatus, featuring the third embodiment of the present invention.

Referring to FIG. 10, the unit includes first SDRAM 2201, second SDRAM 2200, a data selector 2202, a first dual-port buffer 2203, a second dual-port buffer 2204, a third dual-port buffer 2205, a buffer manager 2206, an SDRAM controller 2207, a state manager 2208, a command manager 2209, a mode manager 2210, a timing observer 2211, a flag detector 2212 for controlling timing of frames, a barrel shifter 2213, switches 2o, 2p and 2q, and three-state buffers 2r and 2s.

More specifically, the controller 2101, shown in FIG. 8 which includes the configuration shown in FIG. 10, receives a control instruction and setting data from MPU (not shown), and performs input/output control of memories based on a predetermined sequence in accordance with the received instruction and data. Further, in the third embodiment of the present invention, the first and second frame memories shown in FIG. 8 are configured with the first and second SDRAMs 2201 and 2200, respectively, as shown in FIG. 10. Further, the modification block 2103, shown in FIG. 8, for developing an image and the controller 2101 are configured with hardware, i.e., buffers and logic circuits arranged in a single application specific IC (ASIC), in the third embodiment.

The data selector 2202 is also arranged in the ASIC; accordingly, the data selector 2202, the first to third dual-port buffers 2203 to 2205, the buffer manager 2206, the SDRAM controller 207, the state manager 208, the command manager 209, the mode manager 210, the timing observer 2211, the flag detector 2212, the barrel shifter 2213, and the switches 2o to 2q are configured in one-chip ASIC. Below, correspondence between units and elements shown in FIGS. 8 and 10 are described.

As described above, FIG. 10 shows a specific example of the path selectors 2100a to 2100f, the controller 2101, the modification block 2103, and the first and second frame memories 2021 and 2022 shown in FIG. 8. The data selector 2202 is a unit including the path selectors 2100a to 2100f collectively, and controlled by the mode manager 2210 which is a configuration element of the controller 2101.

In FIG. 8, the output from the first or second frame memories 2021 or 2022 is directly inputted to the D/A converter 2106 via the path selector 2100f; however, when SDRAM is used as frame memory as shown in FIG. 10, since it is necessary to control a burst transfer sequence, RAS (Row Address Strob) pre-charging, refreshing, and so on, the output is temporarily stored in a buffer and time matched (stuffing). Therefore, in FIG. 10, the dual-port buffer 2205 for adjusting timing for the video encoder 2107 is added. Further, if the video encoder 2107 conforms to a digital I/F, then a unit for forming the output into signals having the digital component video signal format, is needed in place of the D/A converter 2106.

The first to third dual-port buffers 2203 to 2205 are not independent devices differing from video RAM, but implemented as microcells in ASIC. Therefore, comparing to a case of using independent dual-port RAM as frame memory, using SDRAM and ASIC of a sufficient chip size reduces the cost of the image processing apparatus.

Further, each of the first to third dual-port buffers 2203 to 2205 does not have the capacity of storing an image frame, but has the capacity of storing data of (SDRAM data width)×256, at most. Regarding the first and second dual-port buffers 2203 and 2204, single-port buffers may replace them by providing an arbiter having a control function for avoiding data conflict; however, throughput for processing a single frame of image data decreases.

The first and second dual-port buffers 2203 and 2204, the switches 2o to 2q, the three-state buffers 2r and 2s, and the barrel shifter 2213 are configuration elements of the modification block 2103 shown in FIG. 8. The buffer manager 2206, the SDRAM controller 2207, the state manager 2208, the command manager 2209, the mode manager 2210, the timing observer 2211, and the flag detector 2212 are configuration elements of the controller 2101 shown in FIG. 8. In FIG. 10, lines, which connect blocks, having arrowheads are for transferring status control signals including data setting and a control trigger signal, and lines, which also connect blocks, with slashes indicate data bus for transmitting image data. Arrows near the lines with slashes (i.e., data buses) show the directions of data flow.

Next, operation of each element shown in FIG. 10 is explained. As described above, the feature of the third embodiment of the present invention is that the content of frame memory (image data) which is currently stored is displayed, and, when modification (e.g., rotation) of the content of the frame memory is requested, while continually displaying the content of the frame memory, the identical image data is copied to another frame memory which is independently controlled, and the copied image data is modified. Then, after the modification of the image data (preparation of data to be outputted) is completed, the displayed image is changed to the modified image at the start of the next frame period.

The first and second SDRAMs 2201 and 2200 correspond to the aforesaid plurality of frame memories which are independently controlled. The statuses of the first and second SDRAMs 2201 and 2200 are controlled by the SDRAM controller 2207. In response to the control by the SDRAM controller 2207, data is written to and read from the first and second SDRAMs 2201 and 2200. The SDRAM controller 2207 controls the command statuses and addresses of the first and second SDRAMs 2201 and 2200 separately. Further, the SDRAM controller 2207 also has to control the first and second SDRAMs 2201 and 2200 in synchronization with the first to third dual-port buffers 2203 to 2205, which the data inputted to or outputted from the first or second SDRAM 2201 or 2200 is to be transferred from or to, on the basis of data input/output status of the first to third dual-port buffers 2203 to 2205. Accordingly, the controller 2207 outputs synchronizing signals to the buffer manager 2206 for managing the status of each buffer.

The operation of the buffer manager 2206 follows the operation of the SDRAM controller 2207, and the SDRAM controller 2207 generates a SDRAM status signal at each clock timing in response to a state control timing signal from the state manager 2208. Different data input/output control of frame memory is performed when capturing a read image, when developing an image, e.g., for rotation, and when generating an index image, for instance. In this stage, conditions for selecting one of several sequences of data input/output control for the respective operations (mode) are designated by the command manager 2209.

The mode manager 2210 receives a memory control instruction from MPU, instructs assigned functions (input/output statuses) of the first and second SDRAMs 2201 and 2200 to the data selector 2202, and sets a command array necessary for a designated mode to the command manager 2209. The command manager 2209 sets a data input/output control sequence to be performed in the next frame period in the SDRAM controller 2207 in accordance with the command array. Further, it also notifies the state manager 2208 of the selection result of the data input/output control sequence for the SDRAMs. The state manager 2208 designates timing to output a status signal to the SDRAM controller 2207 on the basis of timing information of frame period transferred from the timing observer 2211, as well as switches states of input data for the second dual-port buffer 2204 (three-state buffer 2r). The foregoing operation is performed to avoid conflict of data on the bus, since the bus between the second dual-port buffer 2204 is for bi-directional communication.

The bi-directional control of data to/from the second dual-port buffer 2204 is necessary for performing reduction of an image when rotating the image by, e.g., 90 degrees. In the third embodiment, the reduction of the image is performed in the horizontal and vertical directions in time division. Thus, in a case of performing reduction of the image in the horizontal direction first, after data is pooled in the first dual-port buffer 2203, reduction of the image in the horizontal direction is performed by the barrel shifter 2213, and the obtained data is temporarily stored in the second dual-port buffer 2204. Thereafter, data is read from the second dual-port buffer 2204 for reducing the image in the vertical direction, the switch 2p is changed so as to store the data to the second dual-port buffer 2204 via the barrel shifter 2213. The three-state buffer 2s is used for securing a path for storing the reduced image data in the second dual-port buffer 2204, and read address and write address of the three-state buffer 2s should be controlled separately. In a case of rotating an image by 180 degrees, the image does not to be reduced, therefore, the switch 2q is controlled so that the data does not select the output from the barrel shifter 2213. Further, when rotating an image, the switch 2o is controlled to select the input from the switch 2q.

As shown in FIG. 29B or 29D, for rotating an original image by 90 or 270 degrees, the image should be reduced so that width of the original image is displayed within the height of a display screen whose the aspect ratio is 3:4 (height:width). If the image is not reduced, there would be an area or areas of the original image which are not displayed since the height of the rotated image is greater than the height of the display screen. In addition, there would be an area or areas in the display screen where no image is displayed. Accordingly, in order to display the overall image, if the aspect ratio of the original image is 3:4, it is necessary to reduce the size of the image to 75% both in width and height.

Figure 11:
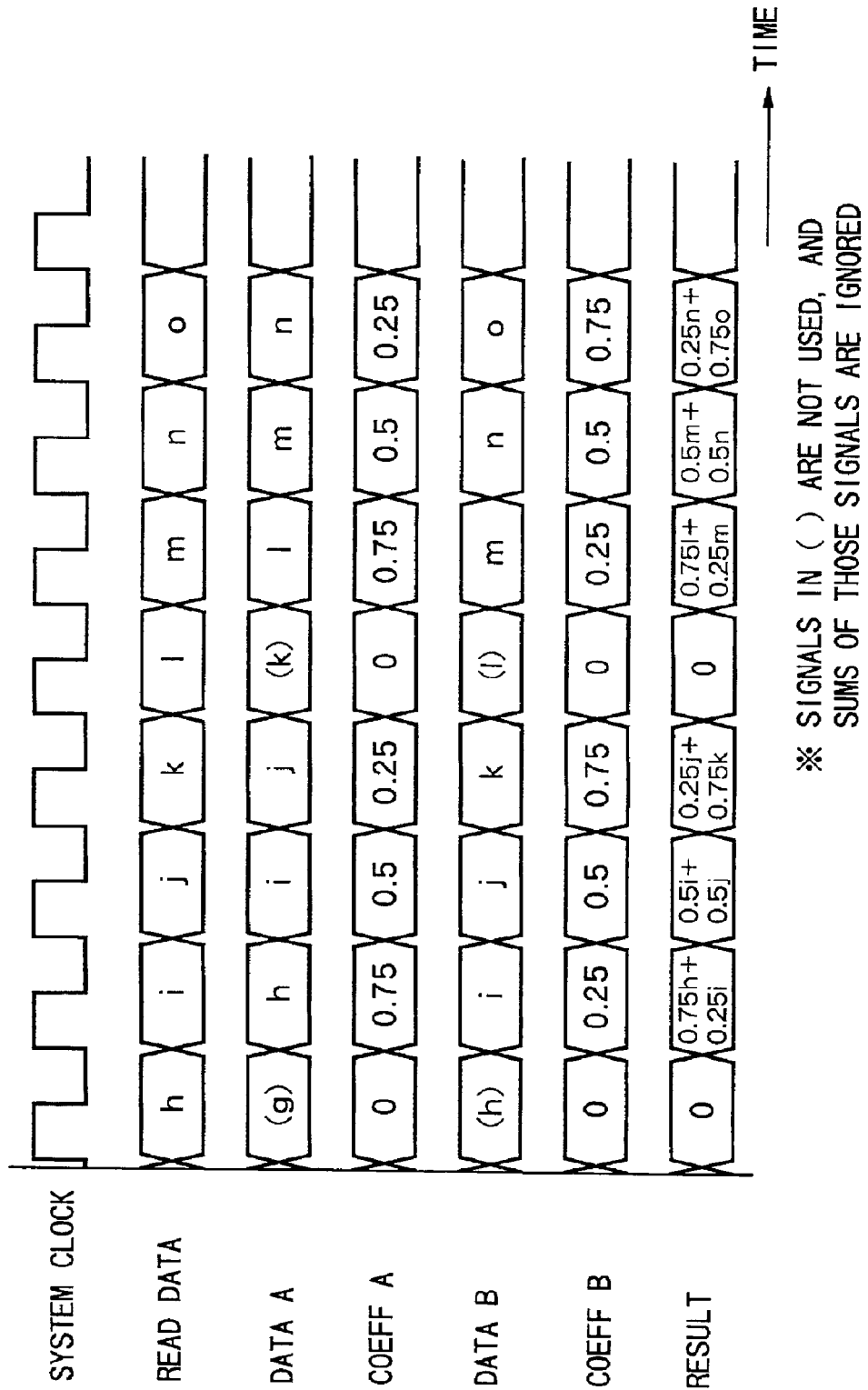
FIG. 11 is a timing chart of data reduction processing according to the third embodiment of the present invention.

Next, the reduction operation associated with the rotation of an image is explained with reference to FIGS. 11 to 13. As described above, in order to display an overall image after rotating the image by 90 or 270 degrees, since the aspect ratio of the image is 3:4, a reduction operation for reducing the size of the image to 75% is required. The barrel shifter 2213 shown in FIG. 10 is for performing the reduction operation. FIG. 11 shows a time chart for operating data to reduce an image by the barrel shifter 2213. Referring to FIG. 11, in accordance with a system clock, data is read sequentially from the first dual-port buffer 2203, and delayed by one clock period to generate data A. Non-delayed data is referred to as data B. Coefficients to be used for multiplying the data A and data B are coefficient sequences, coff A and coff B, respectively. The data A and data B are multiplied by the coefficient sequences coff A and coff B, respectively, and the corresponding products are added. The sum is referred to as "result". As shown in FIG. 11, data is discarded every fourth pixel and data for three pixels remains, thereby the size of the image is reduced to 75%. In the third embodiment, the reduction operation is performed in the horizontal direction and in the vertical direction in time division using a single circuit; however, the present invention is not limited to this, and two such circuits may be provided for the respective directions.

Figure 12:
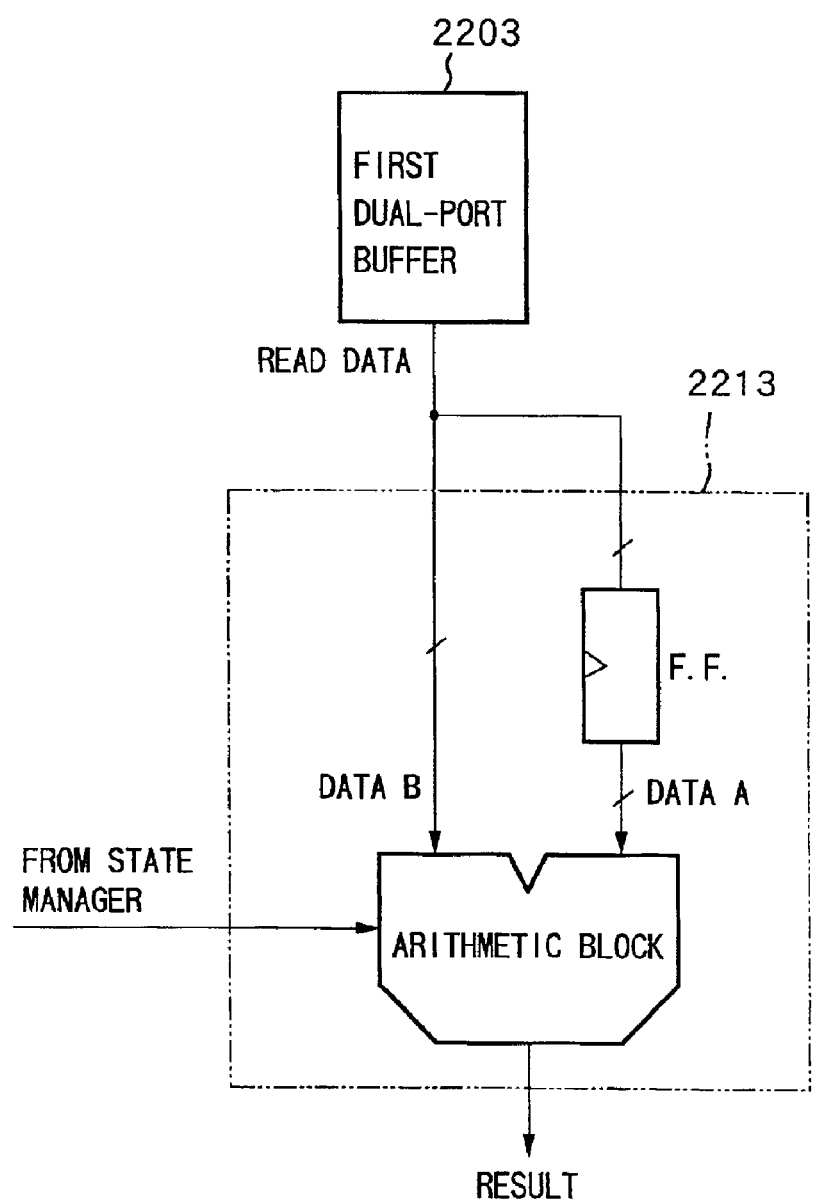
FIG. 12 is a block diagram illustrating a configuration of a data operation block for data reduction processing according to the third embodiment of the present invention.

FIG. 12 is a block diagram illustrating details of the first dual-port buffer 2203 and the barrel shifter 2213 as a block for operating data. For accomplishing the third embodiment, function for delaying the read data for one clock period to obtain the data A is required in the barrel shifter 2213. In the example shown in FIG. 12, the function is realized by a flip-flop for each bit of the data bus. The coefficient sequences coff A and coff B are set in an arithmetic block shown in FIG. 12.

The multiplied results between the respective coefficients of coff A and coff B and the data A and data B, are obtained using shift registers by shifting the data by one bit and two bits, without using a divider. In the third embodiment, since it is necessary to down load data representing all the pixels of a frame image from memory, the barrel shifter is used to complete the shifts in one clock period to improve performance.

Figure 13:
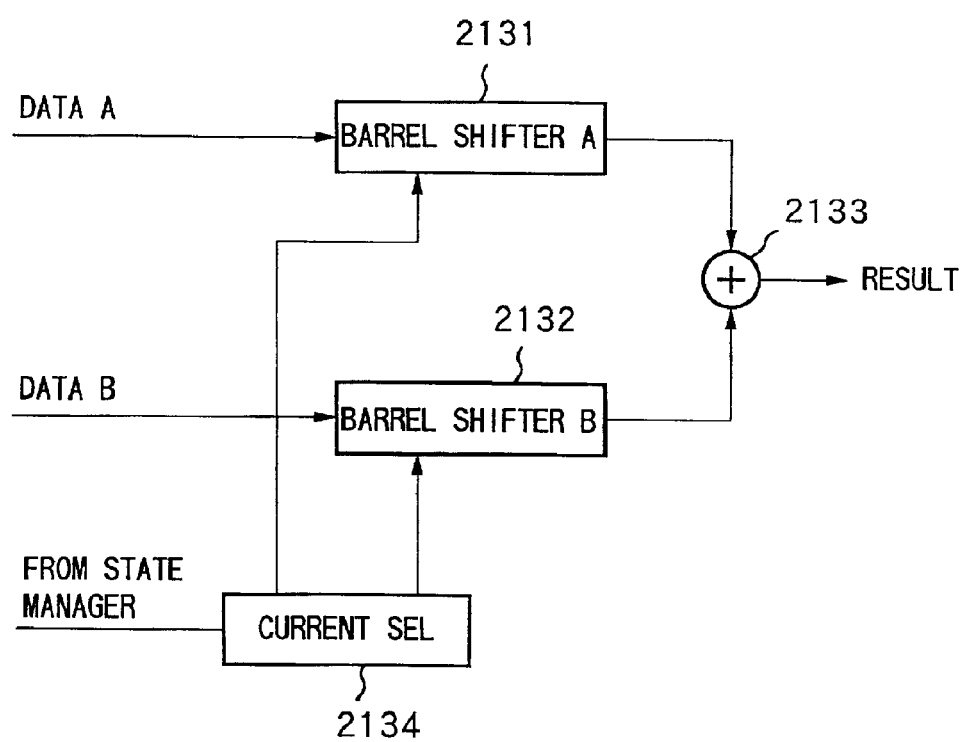
FIG. 13 is a block diagram-illustrating a configuration of a barrel shifter used in the data reduction processing according to the third embodiment of the present invention.

FIG. 13 shows a detailed configuration of the barrel shifter 2213 for illustrating the details of the arithmetic block. A barrel shifter is capable of arbitrarily exchanging the bit order of input data. In the third embodiment, data is shifted toward the least significant bit to realize a multiplication of $\frac{1}{2}^n$ (n is natural numbers), and two barrel shifters, a barrel shifter A 2131 for multiplying the data A by the coefficients coff A, and a barrel shifter B 2132 for multiplying the data B by the coefficients coff B, are provided. Each of the barrel shifter A 2131 and the barrel shifter B 2132 has two shift registers; one is set to shift data by one bit, and the other is set to shift the data by two bits. The shift amount may be arbitrarily set for realizing another coefficient from a combination (gate) circuit. The coefficients to be multiplied are controlled as a sequence for each clock by the shift manager 2208. With the above configuration of the barrel shifters A 2131 and B 2132, for multiplying data A or B by a coefficient 0.25, only the data shifted by two bits is outputted, and for multiplying data A or B by a coefficient 0.5, only the data shifted by one bit is outputted. Further, for multiplying data A or B by a coefficient 0.75, the data shifted by one bit (×0.5) and the data shifted by two bits (×0.25) is added. Therefore, each of the barrel shifter A 2131 and the barrel shifter B 2132 has an adder for adding products (i.e., one-bit-shifted data and two-bit-shifted data) outputted from the two shift registers. In FIG. 13, reference numeral 2133 denotes the adder for adding the outputs from the barrel shifter A 2131 and the barrel shifter B 2132 to obtain the "result", and reference numeral 2134 denotes the current selection.

Note, in the third embodiment, delaying of data, multiplying data by coefficients, and addition of the products are performed in order to keep the quality of a reduced image high, however, it is possible to simply discard data every four pixels.

Next, an image sensing operation and a rotation operation of an image performed in the image processing apparatus according to the third embodiment of the present invention having the foregoing configuration are explained with reference to flowcharts shown in FIGS. 14 to 17. Note, sequences other than the image sensing operation and the rotation operation are not included in FIGS. 14 to 17. In the third embodiment, SDRAM is used as the frame memory, and accordingly, as for operations other than the image sensing operation and the rotation operation, there is a refreshing operation of the SDRAM, and this operation is performed during the vertical blanking period when data to be displayed is not transferred.

Figure 14:
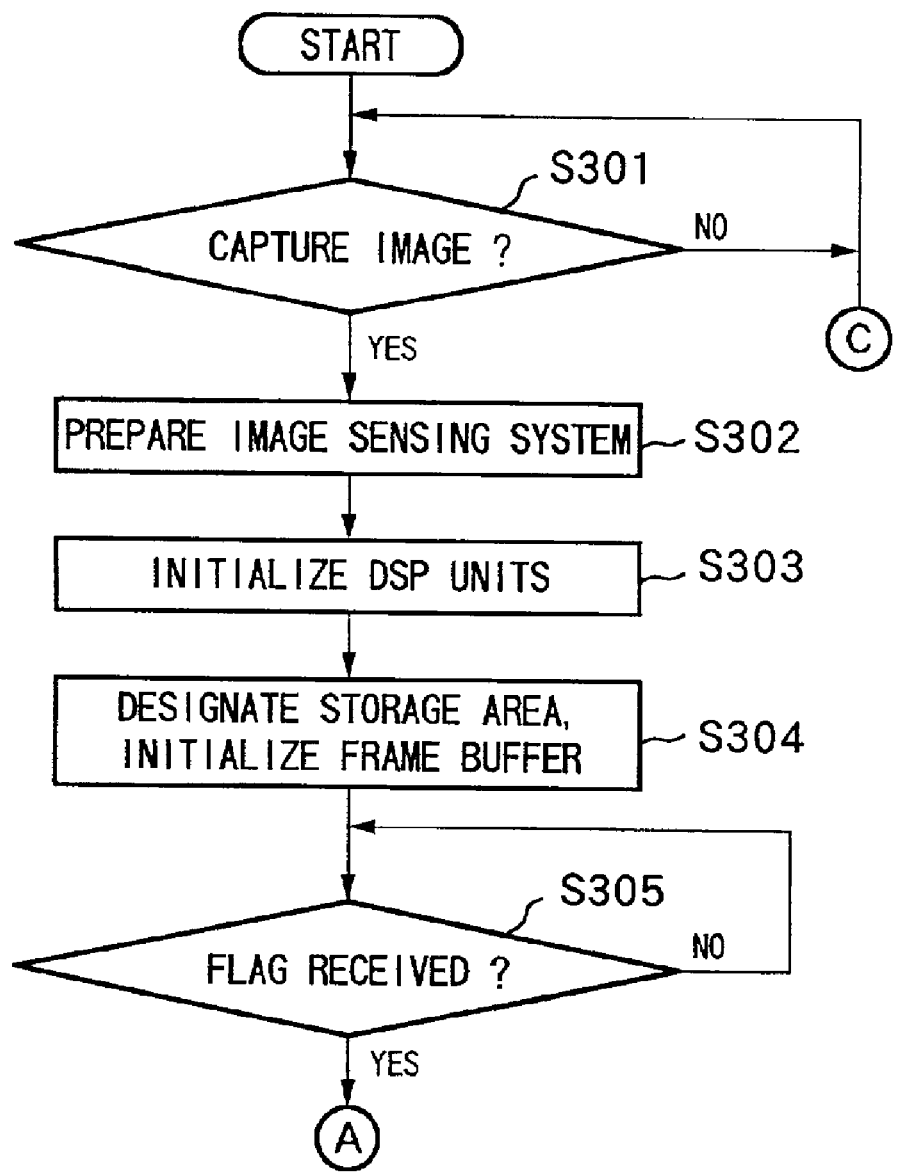
FIG. 14 is a flowchart showing image sensing/rotation processing in the image processing apparatus according to the third embodiment of the present invention.
Figure 15:
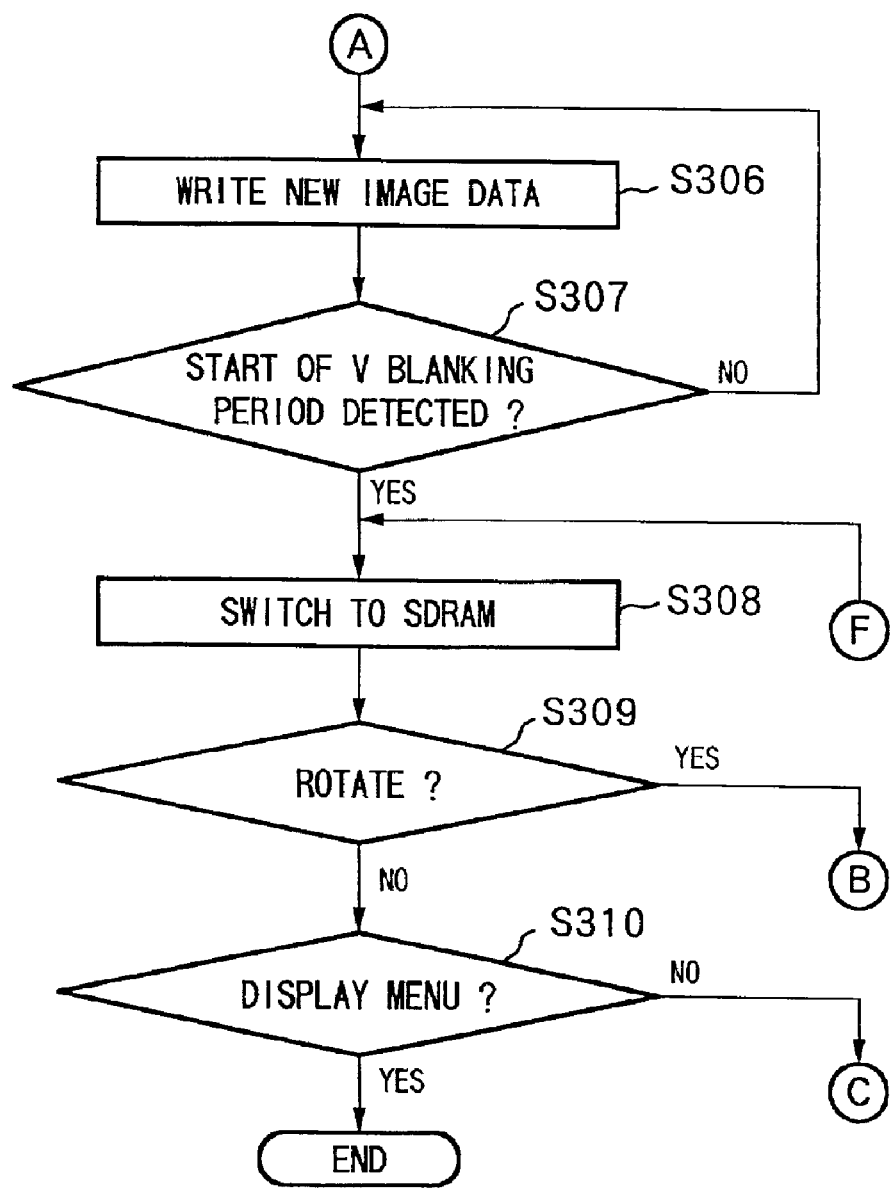
FIG. 15 is a flowchart showing the image sensing/rotation processing in the image processing apparatus according to the third embodiment of the present invention.
Figure 16:
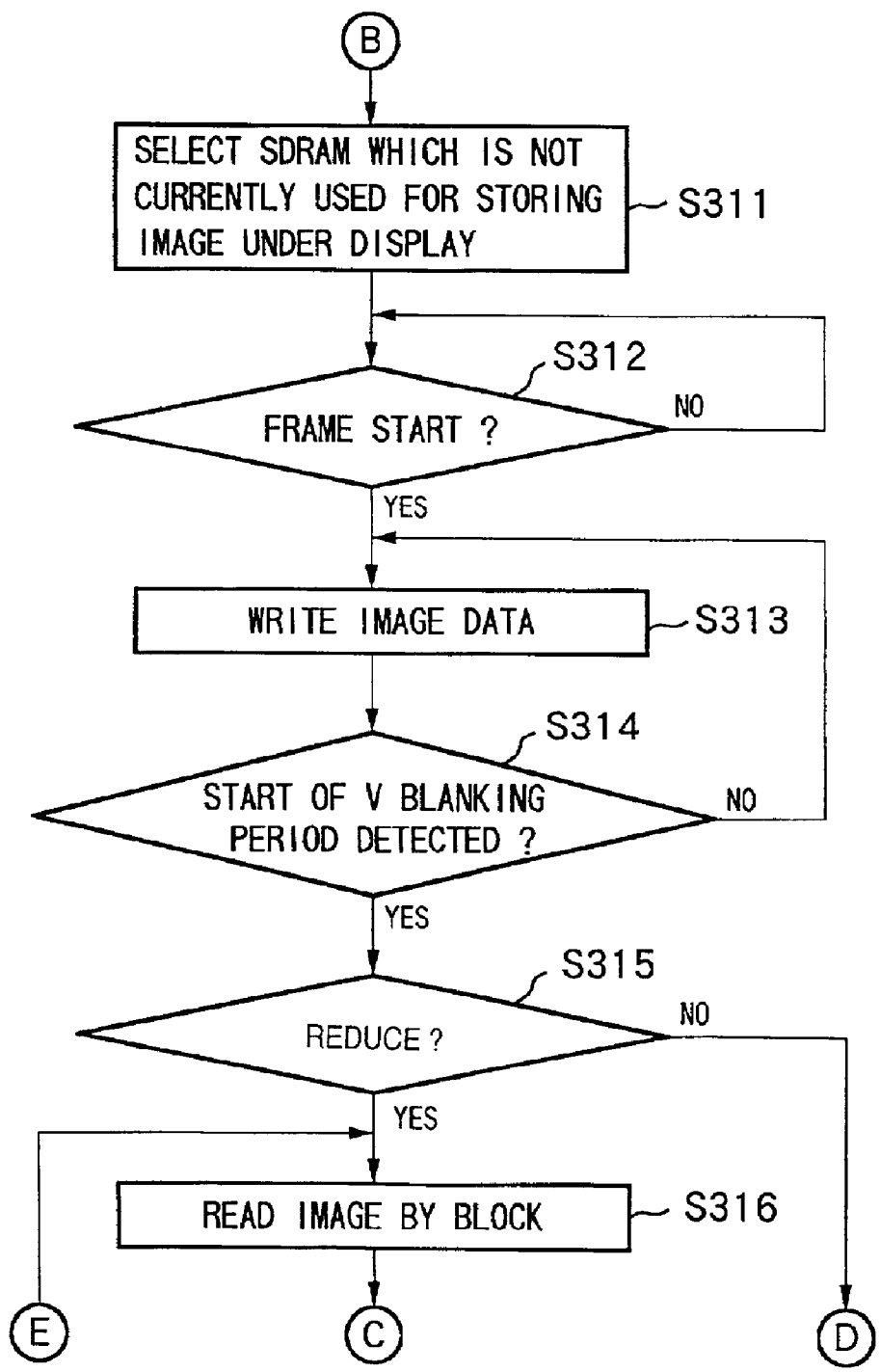
FIG. 16 is a flowchart showing the image sensing/rotation processing in the image processing apparatus according to the third embodiment of the present invention.
Figure 17:
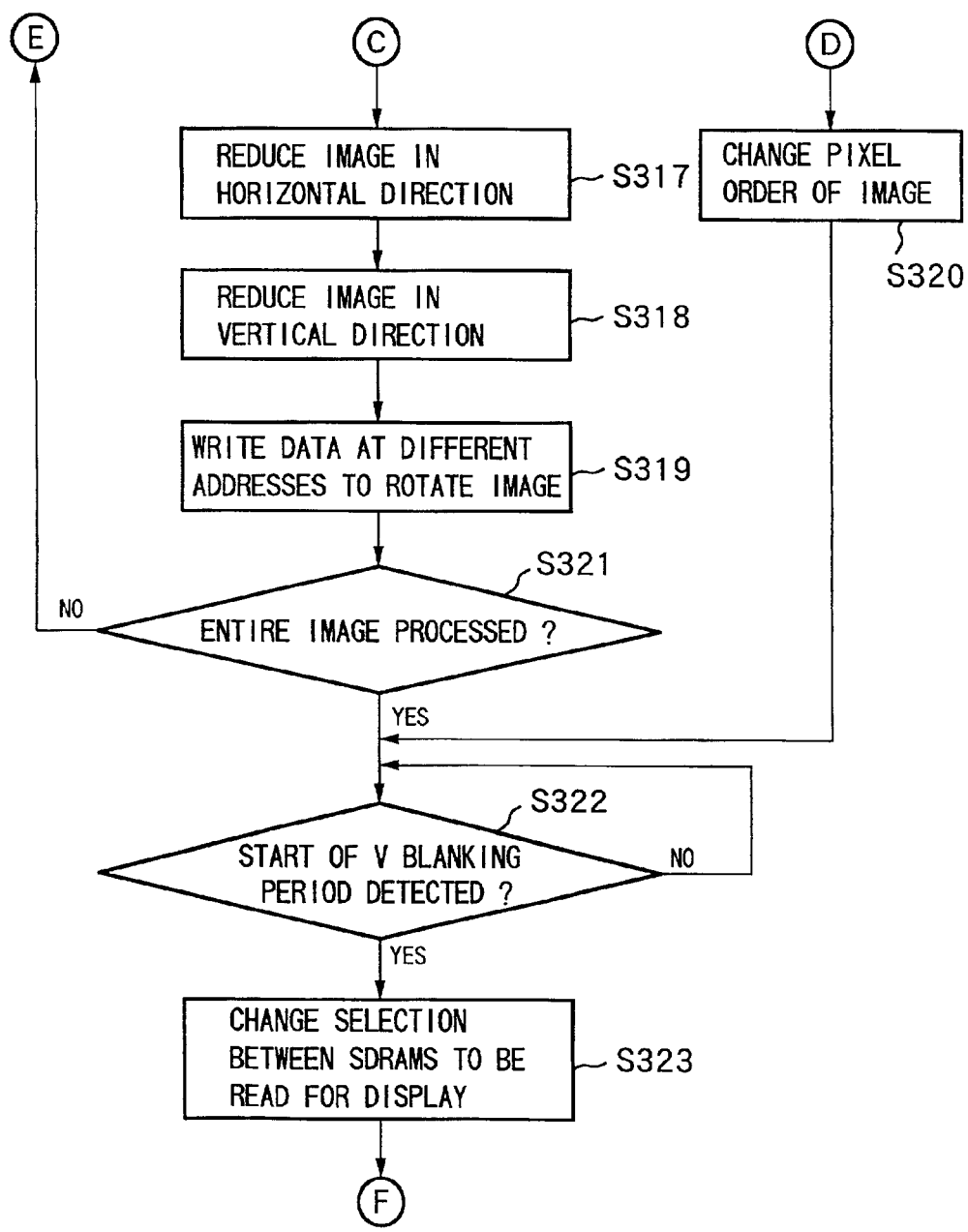
FIG. 17 is a flowchart showing the image sensing/rotation processing in the image processing apparatus according to the third embodiment of the present invention.

In FIG. 14, the process starts while waiting for an instruction to capture an image. During this process, an image which has been stored in the first or second SDRAM 2201 or 2200, an index image, or a menu, is displayed. When a user designates to capture a next image (i.e., to scan another film image) using a remote controller, for instance, in step S301, then the image sensing system is prepared for sensing an image in step S302. In the preparation, if the backlight is off and it has been a considerably long time since an image sensing operation has been performed last, for instance, it is turned on and the process waits until the backlight is stabilized. Then, in step S303, units for processing digital signals (DSP units) are initialized. This process is performed when white balance processing and γ correction are necessary for each frame of the film.

Thereafter, designation of a storage area in a frame buffer is performed, as well as the frame buffer is initialized, if necessary, in step S304. In this step, the mode manager 2210 determines in which of the first and second SDRAMs 2201 and 2200, a sensed new image is to be stored, and also determines the address area in the assigned SDRAM. This process is for properly assigning an area of a SDRAM for storing the new image, and if the SDRAM only has an enough capacity of storing a frame image, the above process is not needed, and in a case where an index image is stored in the same SDRAM, for instance, the area for storing the new image must be designated. In the third embodiment, the memory further has an area used for developing an image. Further, in the third embodiment, the sensed image is to be stored in the first SDRAM 2201, and this condition is set as an initial state by the SDRAM controller 2207 via the command manager 2209. Further, if the area of the SDRAM reserved for the new image is smaller than the area to be read out for display, it is necessary to initialize an additional area outside of the area where the new image is stored with a predetermined value so that the outside area of the image on the display screen is expressed with a color background. Note that the order of the processes of steps S302 to S304 are not limited to above, and the processes may be performed simultaneously, and, if any of the processes is not needed, it may be skipped.

After initializing respective units for storing the new image, the process waits in step S305 until receiving an flag indicative of the start of the next frame period. The flag indicating the start of the next frame period may be a vertical blanking signal transferred from the DSP units, or, if the digital data transferred from the DSP units has a predetermined format, then the decoded signal of identification information specific to the format may be the flag. The specific information would be SAV (Start of Active Video) in the ITU656 format. After receiving the start flag of the next frame period, in step S306, the newly sensed image is stored in the area of the selected memory, i.e., the first SDRAM 2201 designated in step S304 in this case.

When storing the data of the new image, the switch 2o and the three-state buffer 2r are controlled so as to temporally store the digital data of the new image from the DSP units in the second dual-port buffer 2204. The second dual-port buffer 2204 stores the data at a sampling rate of the DSP units, and transfers the stored data to the first SDRAM 2201 at a higher rate than the sampling rate in step S307, and the valid data is kept stored until the vertical blanking period starts. The start of the vertical blanking period may be detected by detecting a vertical blanking synchronizing signal transferred from the DSP units, or by detecting the EAV (End of Active Video) in the ITU656 format. The flag detector 2212 detects the start of the vertical blanking period. The result of the detection is checked by the timing observer 2211 and the timing observer 2211 notifies the state manager 2208 of timing for switching control sequences. The foregoing processes are performed when an image is read by frame (non-interlace scanning) using an area sensor such as the CCD. If the CCD reads an image by field (interlace scanning), it is necessary to wait for another vertical blanking period or take image by two horizontal scan lines. Further, when a line sensor is used, scanning position information is added to the image data.

Under this condition, the first SDRAM 2201 stores the image data which is currently displayed; therefore, the output to the video encoder 2107 is switched by the data selector 2202 from the data outputted from the decoder 2104 to the data outputted from the first SDRAM 2201 in step S308. By switching the selection by the data selector 2202 during the vertical blanking period, the change-over of the image does not affect the displaying of the image. Note, in the third embodiment, the synchronizing signals for display are generated on the basis of the start timing of frame of the input device, thus, the vertical blanking period of the input device is especially used. However, if there is a time lag between input timing and output timing, the time lag should be taken into consideration in generating of the synchronizing signals.

While the stored image is being displayed, if a user designates to rotate the image, the MPU (not shown) for controlling the overall operation of the image processing apparatus instructs the mode manager 2210 to rotate the image in step S309 in response to the designation by the user. In the example of rotation shown in FIGS. 29A to 29D, the angle of rotation can be selected from 90, 180 and 270 degrees. Especially, when a 90- or 270-degree rotation is designated, the rotated image is reduced. Further, although it is not specifically explained in the third embodiment, rotation by an arbitrary angle other than the foregoing angles is possible by using a plurality of frame memories, although the structure of an operation unit would be complicated. Further, mirror image processing (reverse of image) should be performed depending upon how a film is mounted on the image sensing system.

If rotation of the image is not designated (NO in step S309), and if no instruction for changing the displayed image to another image, such as a menu, is designated (NO in step S310), then the process waits for an instruction for sensing a new image while displaying the image which has been stored in the memory. Whereas, if it is designated to display the menu, then the process proceeds to perform the designated operation (not shown), and the processing is completed in step S310. If the mode manager 2210 receives a control command to rotate the image currently displayed (YES in step S309), then it controls to set a data input/output control sequence to be performed in the next frame period in the SDRAM controller 2207 via the command manager 2209 as well as controls the data selector 2202 to select the SDRAM which is not currently storing the valid image data for display (in this case, the second SDRAM 2200) as image memory where the image to be processed is to be temporarily stored in step S311. When preparation for the rotation operation is ready, the process waits the start of the next frame of the image under display in step S312. As the next frame starts, storing of the image data starts and is continued until the start of the vertical blanking period is detected in steps S313 and S314. The processes of steps S312 to S314 are similar to the processes of steps S305 to S307, thus, explanation of them are omitted.

The data stored in the memory set in step S311 (the second SDRAM 2200) is for rotation operation, and equivalent to the data stored in the memory (the first SDRAM 2201) which is currently displayed. The feature of the present invention is that the same data of a frame image is stored in a plurality of memories, which can be independently controlled as described above, in a still image sensing/displaying apparatus, such as a film player, while displaying the frame image stored in one memory, the frame image stored in another memory is processed. In the third embodiment, a case of generating and displaying a rotated image by 90×n (n: 1, 2, 3) degrees with respect to the original image is explained; however, it is possible to perform processes other than rotation, such as mosaic processing, for instance.

In step S315, whether or not it is necessary to reduce the image due to rotation of the image by, e.g., 90 degrees is determined. If the reduction is not necessary, then address conversion processing, in which the order of the pixels of the image stored in the second SDRAM 2200 is changed, then the image is stored in the development area, is performed in step S320. When the reduction of the image is to be performed, the entire frame image is divided into a plurality of blocks, and reduction in the horizontal direction, reduction in the vertical direction, and the address conversion processing for changing the order of pixel positions are performed sequentially for each of the plurality of blocks. For example, assume that the number of valid pixels of the CCD (area sensor) is 640×480 pixels, then it is divided into blocks each having an integer multiplication number of 4×4 pixels for deleting one of every four pixels, as described with reference to FIGS. 11 to 13. Thus, the image may be divided into blocks of 8×8 pixels, 16×16 pixels, and so on, and the number of blocks is 1200 (=40×30) in the latter case.

In step S316, image data of one block is transferred from the second SDRAM 2200 to the first dual-port buffer 203. On the image data of one block, reduction in the horizontal direction is performed before rotating the image in step S317. The path of the data in this process is as follows: the first dual-port buffer 2203→the switch 2p→the three-state buffer 2r→the barrel shifter 2213→the switch 2q→the switch 2o→the three-state buffer 2r→the second dual-port buffer 2204. The state manager 2208 operates the switches and three-state buffers at proper time. At this time, the barrel shifter A 2131 and the barrel shifter B 2132 of the barrel shifter 2213 are controlled so that reduction coefficients coff A and coff B as shown in FIG. 11 are obtained.

After the reduction in the horizontal direction is completed, the reduction in the vertical direction is performed in the similar manner in step S318. The path of the data in this process is as follows: the second dual-port buffer 2204→the switch 2p→barrel shifter 2213→the three-state buffer 2s→the second dual-port buffer 2204. Further, when writing the image to the second dual-port buffer 2204 after reduction, the order of pixel positions of the reduced image is changed from when reading the image from the second dual-port buffer 2204, thereby rotation of the image is realized simultaneously by block. After all the data stored in the second dual-port buffer 2204 has processed, the data is transferred to the second SDRAM 2200. At this time, addresses of the second SDRAM 2200 are controlled by block so as to keep the coordinate of the rotated image.

Although it is not shown in the drawings, as a result of the reduction, blank spaces where no image is displayed are created on a display screen. To deal with these areas, a fixed value is developed and stored in the SDRAM, selected to store the rotated image, to display a color background. The foregoing reduction processes by block are performed for all the blocks of a frame image (step S321). Thereafter, the process waits for the start of a vertical blanking period (e.g., frame end flag) in step S322, the selection of the SDRAM to be read for display is changed from the first SDRAM 2201 to the second SDRAM 2200 in step S323, thus the data selector 2202 starts transferring the image stored in the second SDRAM 2200 for display.

According to the third embodiment as described above, after storing image information in an arbitrary memory reserved for storing a frame image (first or second frame memory 2021 or 2022), while the image information is read from the memory and displayed, the same image information is copied to another memory also reserved for storing a frame image (second or first frame memory 2022 or 2021), and the copied image is modified. Then, the image on a display screen is changed from the image currently displayed to the modified image, thereby it is possible to perform a rotation operation on the image which is currently displayed, as well as the image on the display screen is changed to the rotated image without a break in displaying of an image. Further, it is possible to develop an image to be displayed while displaying an image using a general-purpose memory without using video RAM for exclusive use. Further, after digitizing input information of a still image from the image sensing device 2109, the digitized information is stored in the frame memory 2021 (or 2022), and read from the frame memory. Then, video signals are generated for displaying the still image on the basis of the read information.

Fourth Embodiment

In the above third embodiment, as an example of modification of an image, rotation of an image associated with reduction of the image is explained. In the reduction of the image associated with rotation of the image, fixed value data is written to fill the blank areas around the reduced image so as to display a color background. In the fourth embodiment, processing of improving visual effects of a displayed image by providing a mask data for a display area outside of a valid image (i.e., blank portions in the third embodiment) when outputting video signals is explained.

The mask is a frame for filling blank portions, on a display screen, around a valid image and, after the blank portions are replaced by predetermined frame (mask) data, video signals are-outputted. Alternatively, the blank portions may not be developed, and access to a frame memory where the valid image is stored may be stopped while outputting the mask data. With this configuration, it is unnecessary to develop the blank portions, therefore, throughput of developing the image is increased.

Figure 18:
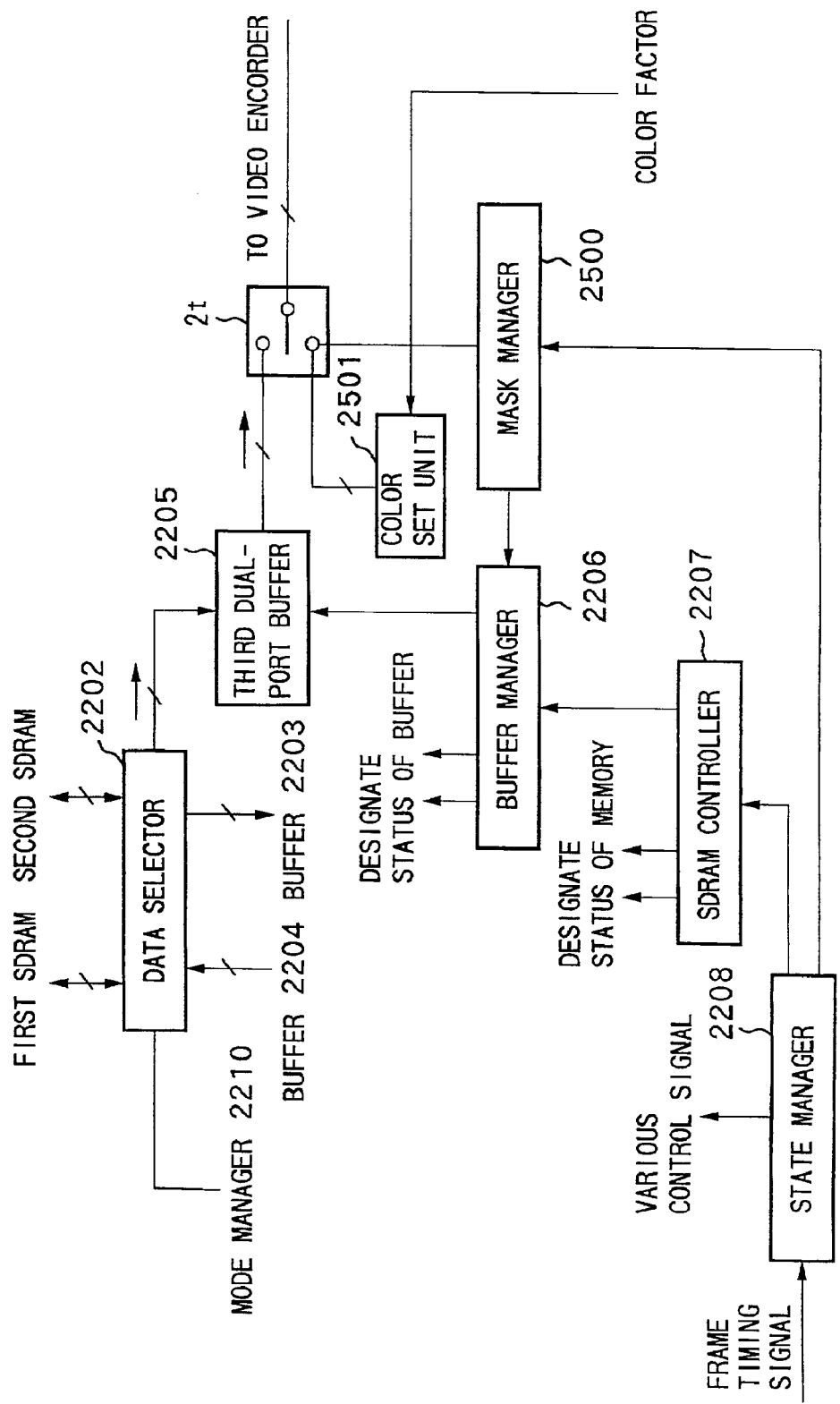
FIG. 18 is a block diagram illustrating a configuration of a masking processing circuit of the image sensing apparatus according to the fourth embodiment of the present invention.

FIG. 18 is a block diagram illustrating a configuration of a mask processor to be added to the image processing apparatus, according to the fourth embodiment of the present invention. An image processing apparatus featuring the fourth embodiment is the same as that explained with reference to FIG. 10 in the third embodiment, except that a mask manager 2500, a color set unit 2501, and a switch 2t are added, upstream, to the video encoder 2107. Note, the basic configuration of the image processing apparatus according to the fourth embodiment is the same as that explained with reference to FIG. 8 in the third embodiment.

Next, the foregoing units are explained below in detail. The mask manager 2500 controls the switch 2t to disconnect the third dual-port buffer 2205 so as to output the mask data from the color set unit 2501 to the video encoder 2107. Further, it also issues start and stop instructions to develop data in the third dual-port buffer 2205 to the buffer manager 2206 in connection with the switch control. The color set unit 2501 is a register for developing and storing mask data for masking the blank portions, and may output background information whose initial condition is fixed, or may successively develop an arbitrary fixed value (a color factor) outputted from MPU (not shown). Further, the color set unit 2501 may successively develop data so as to output an arbitrary pattern, not a solid color, as the mask data, and a switch controller for selecting one of different kinds of mask data may be added. Other configuration elements are the same as those explained with reference to FIG. 10, therefore, the explanation of them is omitted as well as those units are not shown in FIG. 18.

Figure 19:
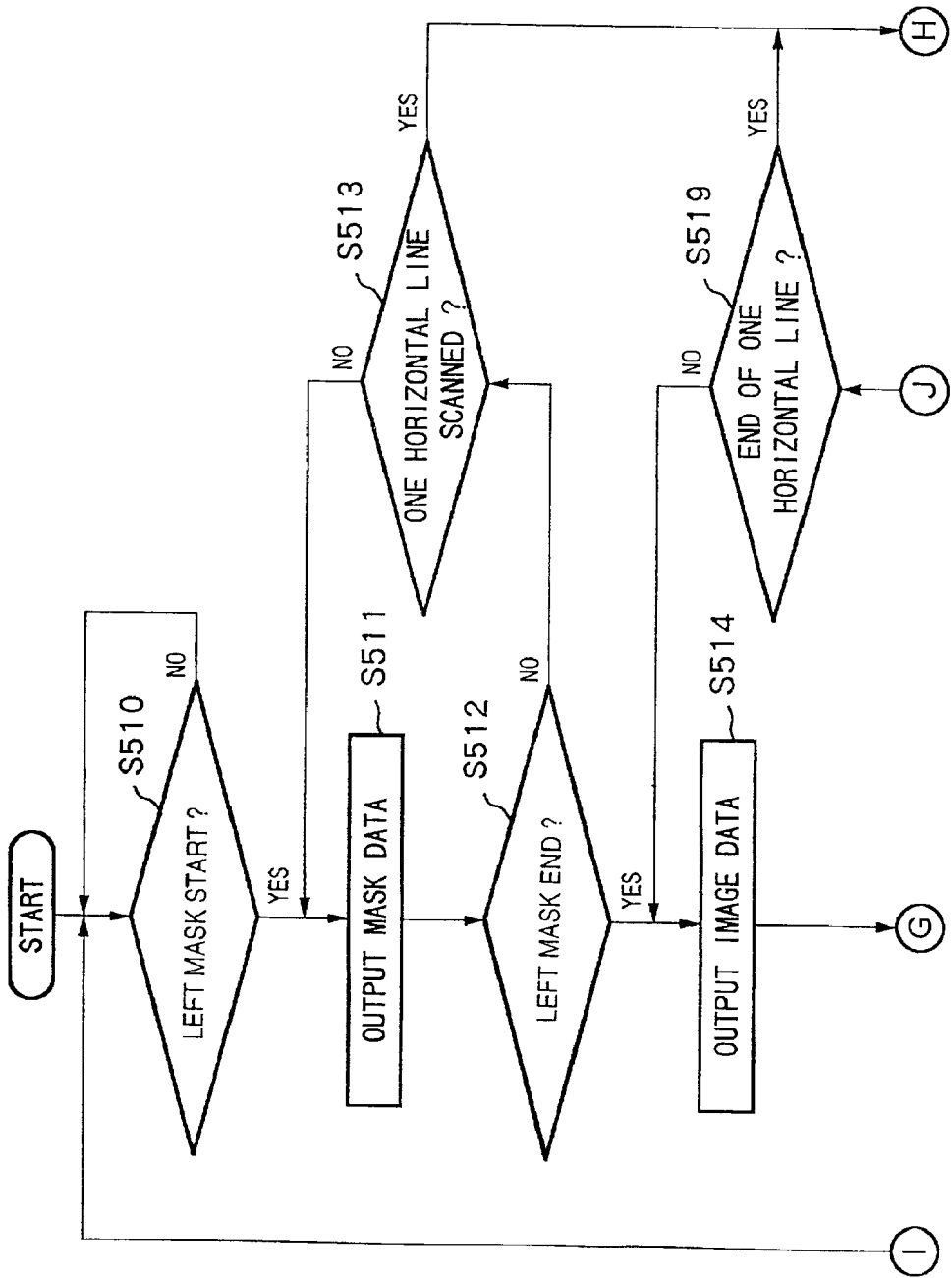
FIG. 19 is a flowchart showing timing control of an image sensing and developing operation in the image processing apparatus according to the fourth embodiment of the present invention.
Figure 20:
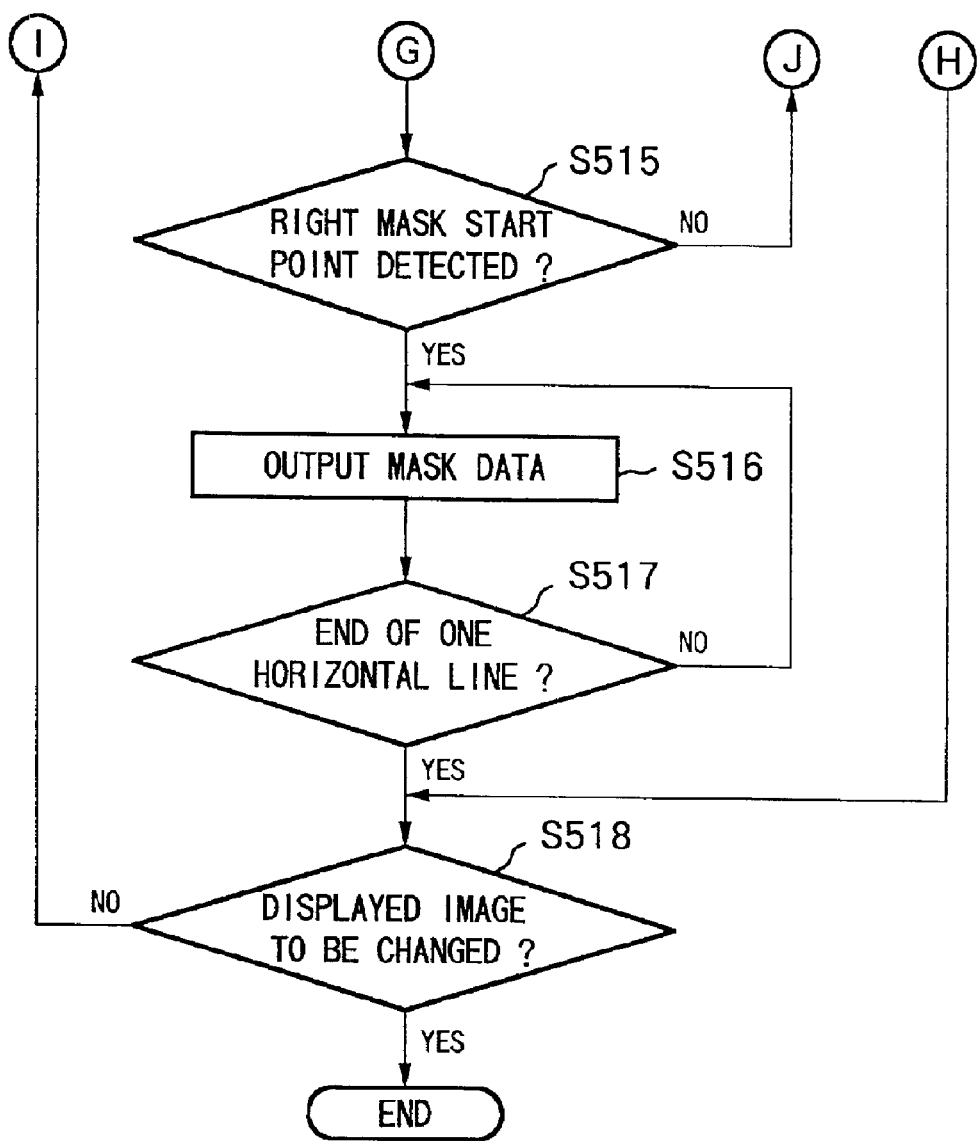
FIG. 20 is a flowchart showing timing control of the image sensing and developing operation in the image processing apparatus according to the fourth embodiment of the present invention.

Next, timing control for developing and storing an image, and for switching data paths in the image processing apparatus according to the fourth embodiment of the present invention are explained with reference to flowcharts shown in FIGS. 19 and 20. The processing shown in FIGS. 19 and 20 are the last half part of a data flow on a data path toward the video encoder 2107, and performed in parallel to the processing shown in FIGS. 14 to 17. Therefore, the processes for sensing a new image and rotating the image are performed in the same manner as described with reference to the flowcharts shown in FIGS. 14 to 17, thus, the explanation of the processes are omitted. Below, processing of providing mask data is explained with reference to the flowcharts in FIGS. 19 and 20.

The fourth embodiment is applicable to any processing for masking a blank portion; however, an image which is reduced associated with rotation as shown in FIG. 29B or 29D is explained as an example. Below, a stage for outputting an reduced and rotated image for display is explained. The image data is developed little by little at high speed in the third dual port buffer 2205, while an output speed of the image data from the buffer 2205 is controlled to the speed desired by the video encoder 2107. In this stage, since the portion on the left of the reduced image is subjected to a masking operation, and the masking operation starts from a step of detecting a start position of masking operation in step S510. Note that the start position of the masking operation is generally arbitrary, and the cases as shown in FIGS. 29B and 29D are simply examples. Thus, when valid pixels are to exist in the leftmost position of a display screen (i.e., the image is arranged at the leftmost position, and the masking operation should not be performed in the left portion), by using a parameter, such as a register for setting an arbitrary masking start point, and controlling it, it is possible to control the start mask point, e.g., not to mask the left portion.

When the start point of an area, subjected to the masking operation, on the left of the valid image (referred to as "left mask start point") is detected (YES in step S510), the mask manager 2500 controls the switch 2t so as to output mask data set in the color set unit 2501, then controls the buffer manager 2206 so as to stop outputting image data from the third dual-port buffer 2205 in step S511. The mask data is outputted until a mask end point is detected in step S512. If one horizontal line has been scanned without the mask end point being detected (YES in step S513), the process proceeds to step S518. Note that information on coordinates of the start points of areas subjected to the masking operation on the right and left of the valid image may be fixed by hardware or may be set by the MPU (not shown).

When the mask end point is detected (YES in step S512), then the image data starts being outputted to the video encoder 2107 (i.e., the switch 2t is changed to the third dual-port buffer 2205), and the image data, outputted from the first or second SDRAM 2201 or 2200 and developed in the third dual-port buffer 2205, is outputted by bit from the third dual-port buffer 2205 in step S514. The image data output (step S514) is performed until a start point of an area, subjected to the masking operation, on the right of the image (referred to as "right mask start point" hereinafter) is detected in step S515. In step S519, whether or not the image data is outputted until the end of a horizontal scanning line is detected without the right mask start position being detected is determined, and if it is (YES in step S519), then the process proceeds to step S518. If the right mask start point is detected in step S515, then in steps S516 and S517, the mask data is controlled to be outputted to the video encoder 2107 until the end of one horizontal scanning line.

The aforesaid processes are continued unless another image is designated to be displayed in step S518. Further, the determination of changing images to be displayed, and actual change-over of displayed images (change-over of statuses of SDRAMs) are performed during the vertical blanking period of the synchronizing period of the video signal. With the masking processing as described above, an area of a SDRAM corresponding to the blank portion where no valid image data is stored does not need to be developed, thereby throughput for developing and displaying an image is improved.

According to the fourth embodiment as described above, in addition to the effects obtained in the third embodiment, it is possible to improve visual effects of a displayed image by providing mask data for a display area outside of a valid image area (i.e., blank portions in the third embodiment) when outputting video signals. Further, the blank portions is not developed, and access to a frame memory (2021 or 2022)) where the valid image is stored is not stopped while outputting the mask data. With this configuration, it is unnecessary to develop the blank portions, therefore, throughput of developing the image is increased.

Figure 21:
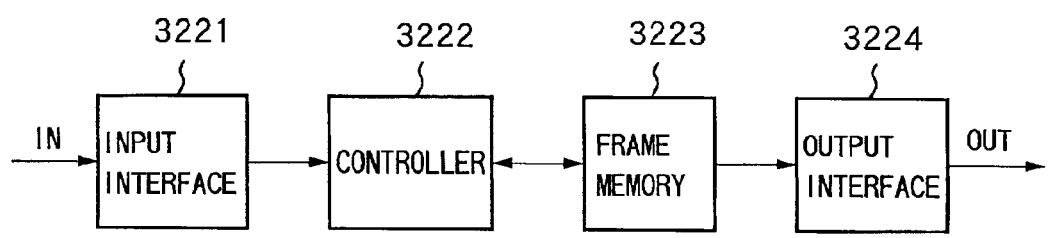
FIG. 21 is a block diagram illustrating a brief configuration of an image processing apparatus provided with input and output interfaces.
Figure 22:
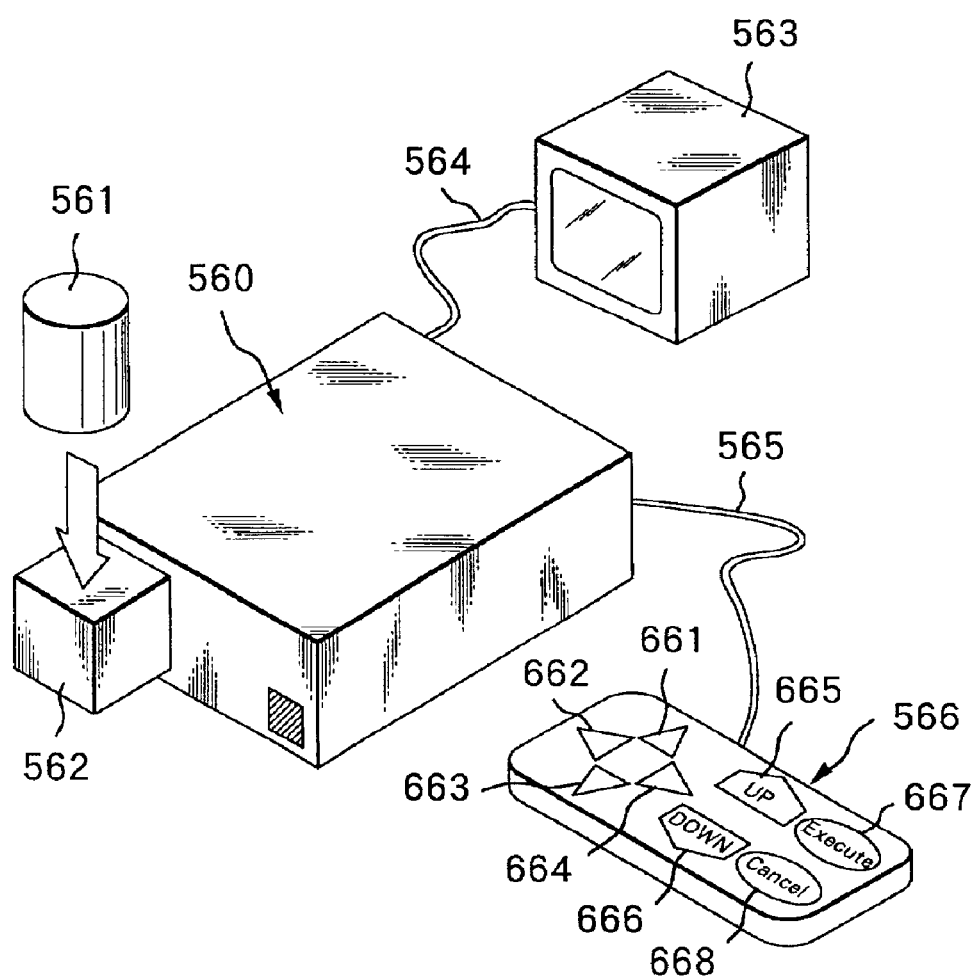
FIG. 22 is an external view of a system including a film player.

In the image processing apparatuses described in the third and fourth embodiments as described above, image data stored in frame memory is read out and video signals are generated on the basis of the read image data for displaying an image. However, the present invention is not limited to this, and read out data may be used in various ways, such as outputting the data to an external device, for instance. As an example of a configuration of the image processing apparatus in a case where image data is transferred to an external device, an input interface 3221, a controller 3222, frame memory 3223, and an output interface 2224, as shown in FIG. 21, are included.

Further, the present invention can be applied to a system constituted by a plurality of devices or to an apparatus comprising a single device.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
   a first memory used for storing first image data;
   an image processing unit adapted to change the first image data read from said first memory to second image data;
   a second memory used for storing the second image data;
   a switch adapted to select the first image data stored in said first memory or the second image data stored in said second memory; and
   a video signal output unit adapted to convert the first or second image data selected by said switch to a video signal and output the video signal,
   wherein said switch selects the second image data after the second image data is stored in said second memory, and said switch changes selection between the first and second image data during a vertical blanking period.

2. The image processing apparatus according to claim 1, wherein said image processing unit performs reduction of the first image data to change the first image data to the second image data.

3. The image processing apparatus according to claim 1, wherein said image processing unit performs rotation of the first image data to change the first image data to the second image data.

4. The image processing apparatus according to claim 1, wherein said image processing unit performs rotation and reduction of the first image data to change the first image data to the second image data.

5. The image processing apparatus according to claim 1, further comprising a masking data addition unit adapted to add mask data to the second image data.

6. The image processing apparatus according to claim 1, further comprising an image sensing unit adapted to sense a film and generate the first image data from a sensed image of the film.

7. The image processing apparatus according to claim 1, further comprising an image sensing unit adapted to sense an image and generate the first image data from the sensed image.

8. The image processing apparatus according to claim 1, wherein said video signal output unit is capable of outputting the video signal to a display device.

9. A control method of controlling an image processing apparatus which includes a first memory used for storing first image data, an image processing unit adapted to change the first image data read from the first memory to second image data, and a second memory used for storing the second image data, said control method comprising:
   a selecting step of selecting the first image data stored in said first memory or the second image data stored in said second memory; and
   a converting step of converting the first or second image data selected in said selecting step to a video signal,
   wherein the second image data is selected in said selecting step after the second image data is stored in said second memory, and selection between the first and second image data performed in said selecting step is changed during a vertical blanking period.

10. The control method according to claim 9, wherein said image processing unit performs reduction of the first image data to change the first image data to the second image data.

11. The control method according to claim 9, wherein said image processing unit performs rotation of the first image data to chance the first image data to the second image data.

12. The control method according to claim 9, wherein said image processing unit performs rotation and reduction of the first image data to change the first image data to the second image data.

13. The control method according to claim 9, further comprising a masking step of adding mask data to the second image data.

14. The control method according to claim 9, further comprising a step of sensing a film and generating the first image data from a sensed image of the film.

15. The control method according to claim 9, further comprising a step of generating the first image data from a sensed image.

16. The control method according to claim 9, further comprising a step of outputting the video signal to a display device.

* * * * *